United States Patent
Kim et al.

(10) Patent No.: US 11,350,413 B2
(45) Date of Patent: *May 31, 2022

(54) DISPLAY APPARATUS AND METHOD OF SETTING OPERATING CHANNEL OF THE SAME

(71) Applicant: SAMSUNG ELECTRONICS CO., LTD., Suwon-si (KR)

(72) Inventors: Jinho Kim, Gwangju-si (KR); Deok-nam Kim, Suwon-si (KR); Ho-jeen Jee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/086,103

(22) Filed: Oct. 30, 2020

(65) Prior Publication Data
US 2021/0051659 A1 Feb. 18, 2021

Related U.S. Application Data

(63) Continuation of application No. 16/798,056, filed on Feb. 21, 2020, now Pat. No. 10,849,127, which is a (Continued)

(30) Foreign Application Priority Data

Feb. 24, 2016 (KR) .......................... 10-2016-0022033

(51) Int. Cl.
*H04W 72/04* (2009.01)
*H04L 67/1061* (2022.01)
(Continued)

(52) U.S. Cl.
CPC ..... *H04W 72/0453* (2013.01); *H04L 67/1063* (2013.01); *H04W 76/14* (2018.02); *H04W 84/12* (2013.01); *H04W 88/08* (2013.01)

(58) Field of Classification Search
CPC . H04W 72/0453; H04W 76/14; H04W 84/12; H04W 88/08; H04L 67/1063
See application file for complete search history.

(56) References Cited

U.S. PATENT DOCUMENTS 9,264,490 B2 * 2/2016 Qi ........................ H04L 67/104
9,667,364 B2   5/2017 Corson et al.
(Continued)

FOREIGN PATENT DOCUMENTS

CN   104092769 A    10/2014
KR   10-2015-0124760 A   11/2015
(Continued)

OTHER PUBLICATIONS

International Search Report and Written Opinion, issued by International Searching Authority in corresponding International Application No. PCT/KR2017/001888, dated May 22, 2017, (PCT/ISA/220, PCT/ISA/210 & PCT/ISA/237).
(Continued)

*Primary Examiner* — Joseph E Dean, Jr.
(74) *Attorney, Agent, or Firm* — Sughrue Mion, PLLC

(57) ABSTRACT

Designating a peer-to-peer (P2P) operating channel between a display apparatus and a portable apparatus connected in a wireless fidelity (Wi-Fi) direct scheme according to whether the display apparatus and an access point (AP) are connected and whether the portable apparatus and the AP are connected.

20 Claims, 16 Drawing Sheets

Related U.S. Application Data continuation of application No. 15/441,737, filed on Feb. 24, 2017, now Pat. No. 10,602,514.

(51) Int. Cl.
  *H04W 76/14* (2018.01)
  *H04W 84/12* (2009.01)
  *H04W 88/08* (2009.01)

(56) References Cited

U.S. PATENT DOCUMENTS

| | | |
|---|---|---|
| 10,098,166 B2 | 10/2018 | Liang et al. |
| 10,602,514 B2 | 3/2020 | Kim et al. |
| 2005/0226183 A1* | 10/2005 | Penumetsa ............ H04W 76/14 370/329 |
| 2009/0011770 A1 | 1/2009 | Jung et al. |
| 2011/0228666 A1 | 9/2011 | Barbieri et al. |
| 2012/0147825 A1* | 6/2012 | Hassan .................. H04W 4/80 370/329 |
| 2012/0166671 A1 | 6/2012 | Qi et al. |
| 2012/0246468 A1 | 9/2012 | Gabor |
| 2015/0230093 A1 | 8/2015 | Park et al. |
| 2015/0312945 A1 | 10/2015 | Park et al. |
| 2015/0365986 A1 | 12/2015 | Lee et al. |
| 2016/0242051 A1 | 8/2016 | Anders et al. |
| 2017/0006117 A1 | 1/2017 | Kafle et al. |

FOREIGN PATENT DOCUMENTS

| | | |
|---|---|---|
| WO | 2004/077920 A2 | 9/2004 |
| WO | 2016/003311 A1 | 1/2016 |

OTHER PUBLICATIONS

Communication dated Jan. 23, 2019, from the European Patent Office in counterpart European Application No. 17756776.5.
Daniel Camps-Mur et al. "Device to device communications with WiFi Direct: overview and experimentation" IEEE Wireless Communications, Jun. 1, 2013 (pp. 96-104).
Communication dated Nov. 2, 2021, issued by the State Intellectual Property Office of P.R. China in counterpart Chinese Application No. 201780010061.8.
Anonymous, "Wi-Fi Direct-Overview and Features", May 6, 2013; URL: https://hsc.com/Resources/Blog/Wi-Fi-Direct-Overview-and-Features. (14 pages total).
Communication dated Mar. 29, 2022 by the Korean Intellectual Property Office in counterpart Korean Patent Application No. 10-2016-0022033.

* cited by examiner

FIG. 8
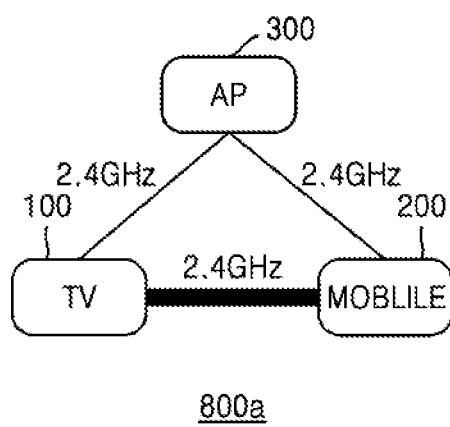
800a
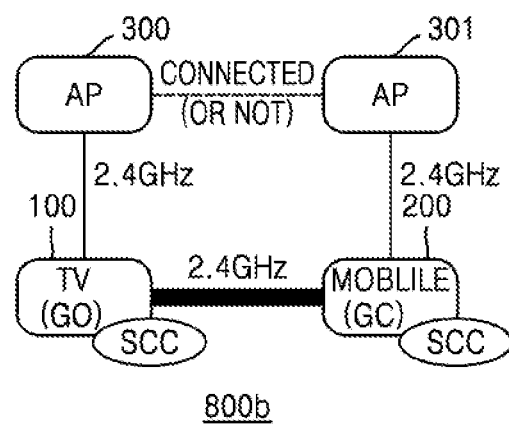
800b
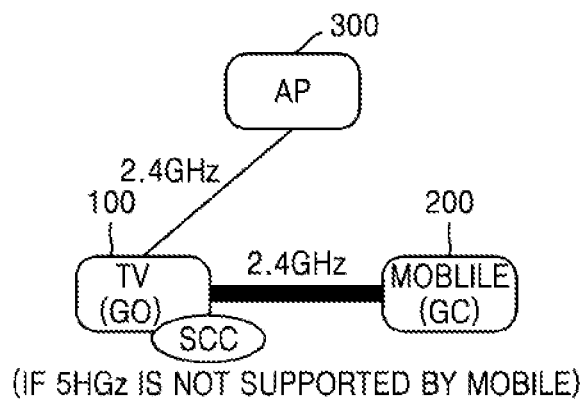
(IF 5HGz IS NOT SUPPORTED BY MOBILE)
800c
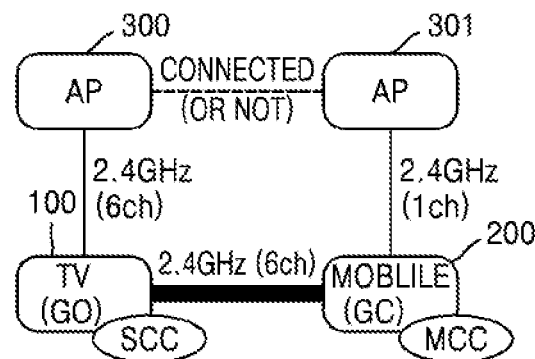
800d

DISPLAY APPARATUS AND METHOD OF SETTING OPERATING CHANNEL OF THE SAME

CROSS-REFERENCE TO RELATED APPLICATION

This application is a Continuation of U.S. application Ser. No. 16/798,056, filed on Feb. 21, 2020, now U.S. Pat. No. 10,849,127, issued on Nov. 24, 2020 in the U.S. Patent and Trademark Office, which is a Continuation of U.S. application Ser. No. 15/441,737, filed on Feb. 24, 2017, now U.S. Pat. No. 10,602,514, issued on Mar. 24, 2020 in the U.S. Patent and Trademark Office, which claims priority from Korean Patent Application No. 10-2016-0022033, filed on Feb. 24, 2016, in the Korean Intellectual Property Office, the disclosures of which are herein incorporated by reference in their entireties.

BACKGROUND

1. Field

Methods and apparatuses consistent with exemplary embodiments of the present application relate to a display apparatus and a method of setting an operating channel of the same, and more particularly, to a method of setting an operating channel of the display apparatus in which wireless fidelity (Wi-Fi) direct connection to the display apparatus is considered.

2. Description of the Related Art

Wi-Fi direct technology may provide direct communication (e.g., peer-to-peer (P2P) protocol connection) to a device supporting Wi-Fi without a network infrastructure device (e.g., an access point (AP), a router, and the like).

Portable apparatuses (e.g., a smart phone, a cellular phone, a personal digital assistant (PDA), a tablet personal computer (PC), a laptop PC, an electronic notebook, an electronic dictionary, a Moving Picture Experts Group (MPEG) audio layer 3 (MP3) player, etc.) and display apparatuses (e.g., including a television (TV)) having displays may share content (e.g., text, images, videos, games, documents, etc.) with each other through the Wi-Fi direct technology.

A P2P operating channel used for a Wi-Fi direct connection may be determined when a P2P group is generated. For example, when a Wi-Fi direct connection is established between a display apparatus and a portable apparatus, a device serving as a group owner (GO) may select a P2P operating channel.

SUMMARY

A peer-to-peer (P2P) operating channel may affect wireless network performance (throughput, packet loss, etc.) according to a setting of a wireless fidelity (Wi-Fi) direct connection. An optimal operating channel is set between devices supporting the Wi-Fi technology to efficiently use wireless bandwidth.

According to an aspect of an exemplary embodiment, there is provided a display apparatus including a transceiver configured to wirelessly communicate with an access point (AP) and a portable apparatus, a memory configured to store first AP connection information including information corresponding to a wireless connection between the display apparatus and the AP, and a controller configured to control the transceiver to receive, from the portable apparatus connectable in a wireless fidelity (Wi-Fi) direct scheme, second AP connection information including information corresponding to a wireless connection between the portable apparatus and the AP, determine a peer-to-peer (P2P) operating channel between the display apparatus and the portable apparatus based on the first AP connection information and the second AP connection information, and control the transceiver to establish a wireless connection between the display apparatus and the portable apparatus through the determined P2P operating channel in the Wi-Fi direct scheme.

The first AP connection information may include at least one of whether the display apparatus and the AP are connected, an operating channel frequency band between the display apparatus and the AP, and an operating channel number between the display apparatus and the AP in the first AP connection information.

According to an aspect of an exemplary embodiment, there is provided a method of setting an operating channel of a display apparatus including storing first access point (AP) connection information including information corresponding to a wireless connection between the display apparatus and an AP, searching for a portable apparatus connectable in a Wi-Fi direct scheme, receiving, from the portable apparatus, second AP connection information including information corresponding to a wireless connection between the portable apparatus and the AP, determining a group owner (GO) using the first AP connection information and the second AP connection information, determining a peer-to-peer (P2P) operating channel between the display apparatus, which is determined as the GO, and the portable apparatus using the first AP connection information and the second AP connection information, and signaling to the AP and the portable apparatus to establish a wireless connection between the display apparatus and the portable apparatus through the determined P2P operating channel in the Wi-Fi direct scheme.

BRIEF DESCRIPTION OF THE DRAWINGS

The above and other aspects will become apparent and more readily appreciated from the following description of the embodiments, taken in conjunction with the accompanying drawings in which:

FIG. 8 is a diagram illustrating a method of setting an operating channel between a portable apparatus and a display apparatus according to an exemplary embodiment of the present disclosure;

DETAILED DESCRIPTION OF EXEMPLARY EMBODIMENTS

Figure 1:
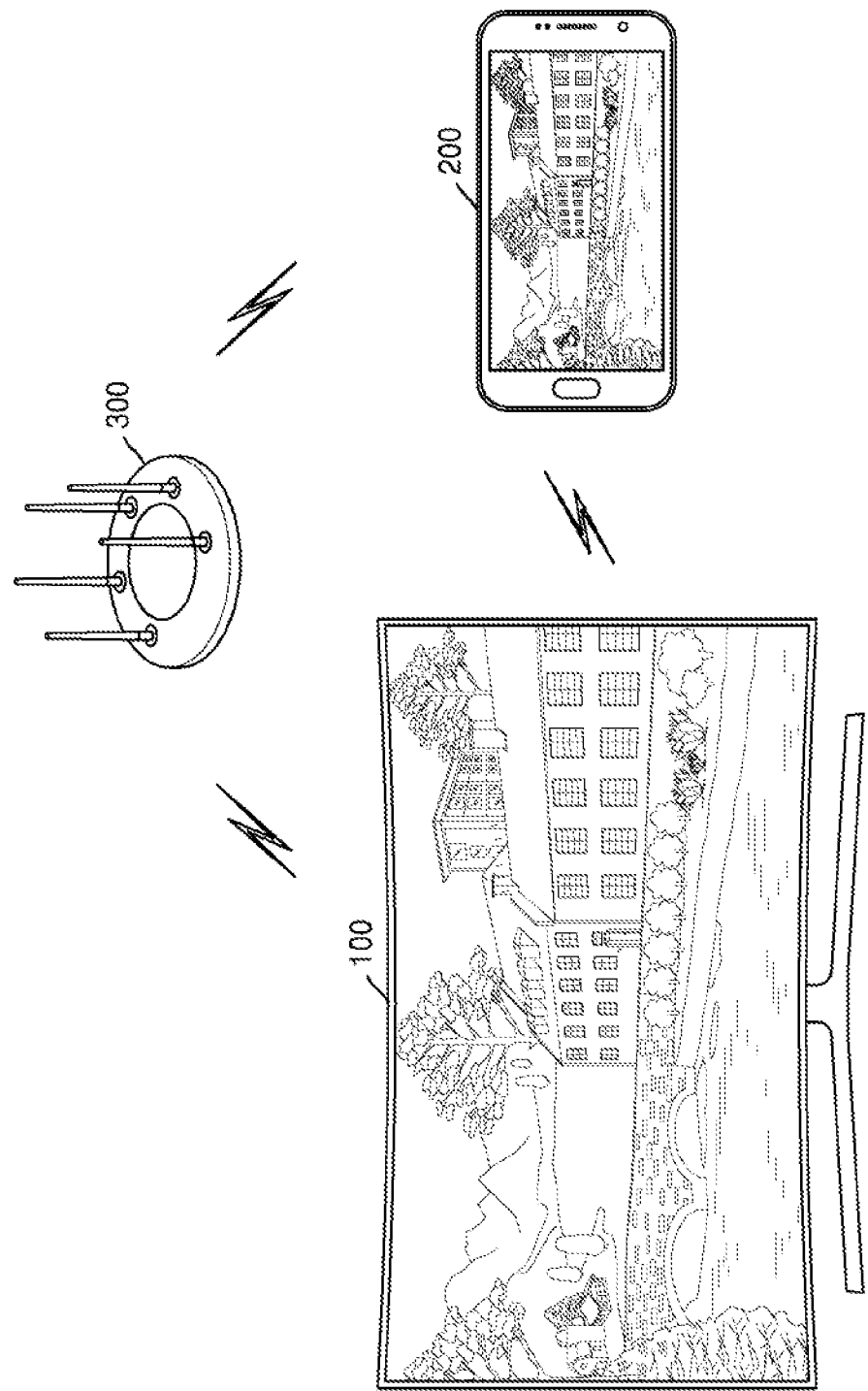
FIG. 1 is a schematic diagram illustrating an operation between a display apparatus and a portable apparatus according to an exemplary embodiment of the present disclosure.

Hereinafter, exemplary embodiments of the present disclosure will be described in detail with reference to the accompanying drawings. Also, a method of using a portable apparatus according to an exemplary embodiment of the present disclosure will be described in detail with reference to the accompanying drawings. Throughout the drawings, like reference numerals refer to like parts or elements which perform substantially the same functions.

Terms including ordinal numbers, such as "first," "second," etc., may be used to represent various elements, but do not limit the elements. The terms are only used for distinguishing one element from another element. For example, a first element may also be called a second element, and similarly, the second element may also be called the first element without departing from the scope of the present disclosure. As used herein, the term "and/or" includes any and all combinations of one or more of the associated listed items. Expressions such as "at least one of," when preceding a list of elements, modify the entire list of elements and do not modify the individual elements of the list.

An application denotes software stored in memory that is executed by a processor of a display apparatus operating system (OS), a computer OS, or a portable apparatus OS and used by a user. For example, applications may include a music player, a video player, an over the top (OTT) service application, a contact application, a calendar application, a memo application, an alarm application, a social network service (SNS) application, a chatting application, a map application, a word processor, a spreadsheet, and the like.

An application (e.g., an application making it possible to set a peer-to-peer (P2P) operating channel) according to an exemplary embodiment of the present disclosure may denote software executable in a display apparatus, a portable apparatus, and an external device (e.g., a server or the like) communicably connected to a portable apparatus in a wireless or wired manner. An application (e.g., the application making it possible to set a P2P operating channel) according to an exemplary embodiment of the present disclosure may denote software that may control a function or operation of an external device (e.g., a server, a portable apparatus, or the like) communicably connected in a wireless or wired manner to a display apparatus in which the software has been installed. Also, software corresponding to a setting of a P2P operating channel according to an exemplary embodiment of the present disclosure may be implemented as an OS, an application, firmware, or the like.

Content may be executed in a display apparatus or a portable apparatus. For example, content may include a video file or an audio file played by a video player, which is an application, a music file played by a music player, a photograph file displayed by a gallery application, a web page file displayed by a web browser, and the like. Contents may denote a set of content.

Content may include a video file, an audio file, a text file, an image file (e.g., a photograph), or a web page displayed or executed by an application. In embodiments of the present disclosure, the term "video" may be used as the same meaning as a moving image. Also, content may include a video file, an audio file, a text file, an image file, or a web page executed in response to a received user input (e.g., a touch, drag, or the like). Content includes a screen of an executed application and a user interface (UI) constituting the application screen. Also, content may include one piece of content or a plurality of pieces of contents.

A widget denotes an application that, when executed, provides a graphic user interface (GUI) supporting interaction between a user and an application or an OS. For example, a weather widget, a calculator widget, a clock widget, and the like are examples of the well-known types of widget applications.

The terminology used herein is for the purpose of describing embodiments, and is not intended to limit the scope of the present disclosure. The singular forms include plural referents unless the context clearly indicates otherwise. It should be further understood that the terms "include," "including," "have," and "having" specify the presence of stated features, integers, steps, operations, components, parts, or combinations thereof when used herein, and do not preclude the presence or addition of one or more other features, integers, steps, operations, components, parts, or combinations thereof.

FIG. 1 is a schematic diagram illustrating an operation between a display apparatus and a portable apparatus according to an exemplary embodiment of the present disclosure.

Referring to FIG. 1, a display apparatus 100 and a portable apparatus 200 may be connected to each other in a wireless fidelity (Wi-Fi) direct scheme (case 1). Also, the display apparatus 100, the portable apparatus 200, and/or an access point (AP) 300 may be wirelessly connected. The display apparatus 100, the portable apparatus 200, and/or the AP 300 may be connected to each other in the Wi-Fi direct scheme. Although FIG. 1 shows the display apparatus 100 and the single portable apparatus 200, the display apparatus 100 may be connected to each of a plurality of portable apparatuses according to an exemplary embodiment of the present disclosure. Also, although FIG. 1 shows that the display apparatus 100 and the portable apparatus 200 are connected to a single AP 300, the display apparatus 100 and the portable apparatus 200 may be connected to different APs.

The display apparatus 100, the portable apparatus 200, and the AP 300 may be connected to each other in one of a Wi-Fi scheme and the Wi-Fi direct scheme. For example, in the Wi-Fi direct scheme, the display apparatus 100 may be connected to the portable apparatus 200 that is connected to the AP 300 (case 2). The display apparatus 100 that is connected to the AP 300 may be connected to the portable apparatus 200 in the Wi-Fi direct scheme (case 3). Also, in the Wi-Fi direct scheme, the display apparatus 100 that is connected to the AP 300 may be connected to the portable apparatus 200 that is connected to the AP 300 (case 4). In case 2 to case 4, the AP 300 that is connected to the display apparatus 100 and the AP that is connected to the portable apparatus 200 may be identical or different.

A connection between devices based on the Wi-Fi direct scheme involves a device discovery process, a group formation process, and a group operation process. For example, the display apparatus 100 and the portable apparatus 200 may be connected in the Wi-Fi direct scheme.

First, in the device discovery process, scanning of a partner device supporting Wi-Fi direct and exchange of device information with the partner device (e.g., including AP connection information) are performed.

Next, in the group formation process, group owner (GO) negotiations are performed to determine a GO that serves as an AP between the display apparatus 100 and the portable apparatus 200. During the GO negotiations, GO intent values may be exchanged between the apparatuses. The display apparatus 100 and the portable apparatus 200 may determine a GO using set GO intent values (e.g., 0 to 15). An apparatus (referred to as a group client below) that has been determined as not being the GO may operate as a group client, a P2P client, or a P2P group client. The GO and the group client may be connected on a one-to-one basis or a one-to-N (here, N is a natural number equal to or greater than two) basis. The number of connectable group clients may be determined according to the GO (e.g., a function and a capability thereof).

In exemplary embodiments of the present disclosure, the display apparatus 100 may be determined as the GO. The portable apparatus 200 may be determined as a group client. In exemplary embodiments of the present disclosure, the group client is not limited to the portable apparatus 200, and may denote an electronic device that may be connected to the GO in the Wi-Fi direct scheme and determined as a group client. Also, in other exemplary embodiments of the present disclosure, the portable apparatus 200 may be determined as the GO.

When the GO negotiations are finished, the display apparatus 100 and the portable apparatus 200 are directly connected. During the GO negotiations, the apparatus (referred to as GO below) serving as the GO may check available operating channel list information of the partner apparatus (e.g., the group client). The GO may select an operating channel using the available operating channel list information. Using the selected operating channel, the display apparatus 100, which has been determined as the GO, may finally establish a direct link with the portable apparatus 200, which has been determined as the group client. In exemplary embodiments of the present disclosure, the GO may denote the display apparatus 100. Also, in exemplary embodiments of the present disclosure, the group client may denote the portable apparatus 200.

Next, in the group operation process, the GO 100 may perform functions of an AP (e.g., AP-like functions) so that the group client 200 and a legacy client may be connected (or associated with each other). The GO 100 may allow connection of another device or perform a start, an end, etc. of the group.

The GO 100 may be considered as an AP by one or more group clients. The GO 100 may perform some of functions provided by a general AP. For example, some of the provided functions may include a function of transmitting a beacon frame (e.g., including basic service set (BSS) information and periodically indicating the presence of a wireless network of the GO 100), a function of supporting a Wi-Fi simple configuration (WSC) registration mode, a function of allocating an Internet protocol (IP) (an IP address allocation based on a dynamic host configuration protocol (DHCP)) which will be used by a group client for data service transmission of an IP-based application, and the like.

An application (e.g., corresponding to a Wi-Fi direct-based service) for file transmission between the GO 100 and the group client 200 may provide a seamless service when a sufficient wireless bandwidth is available. During a Wi-Fi direct connection process, setting of an operating channel of the GO 100 may have the strongest effect on wireless network performance. The operating channel may include a 2.4 GHz frequency band and a 5 GHz frequency band. It may be advantageous to set the operating channel to the 5 GHz frequency band that has little interference compared to the 2.4 GHz frequency band for performance of the Wi-Fi direct connection.

When one of the GO 100 and the group client 200 operates as a concurrent connection device, multi-channel concurrency (MCC) may occur. For example, when the group client 200 that has been connected to the AP 300 through a channel of the 2.4 GHz frequency band is newly connected to the GO 100 through a Wi-Fi direct operating channel of the 5 GHz frequency band, MCC occurs at the concurrently connected group client 200. When MCC occurs, Wi-Fi operating channels of different frequency bands are separately managed in a time-division multiplexing scheme, and thus wireless network performance of the group client 200 may be degraded in comparison to wireless network performance of the group client 200 at which single-channel concurrency (SCC) occurs.

A connection between a GO and a group client based on the Wi-Fi direct scheme may involve minimizing MCC that may occur between the GO and the group client. Also, when MCC occurs in the connection between the GO and the group client based on the Wi-Fi direct scheme, it may be necessary to set an operating channel of the 5 GHz frequency band between the GO and the group client. Further, in the connection between the GO and the group client based on the Wi-Fi direct scheme, the GO may determine whether MCC occurs at each of the GO and the group client.

The display apparatus 100 may be implemented as an analog television (TV), a digital TV, a three-dimensional (3D) TV, a smart TV, a light-emitting diode (LED) TV, an organic LED (OLED) TV, a plasma TV, a monitor, a curved TV having a screen with a fixed curvature, a flexible TV having a curved screen, a bent TV having a screen with a fixed curvature, a variable curvature TV in which a current screen curvature may be changed by a received user input, and/or the like, but those of ordinary skill in the art will understand that the display apparatus 100 is not limited thereto.

In exemplary embodiments of the present disclosure, the term "user" may denote a person who controls a function or operation of the display apparatus 100 or a person who controls a function or operation of the portable apparatus 200.

A user input may be received from the user by one or more user interfaces (e.g., graphical user interface) of at least one of the display apparatus 100 and the portable apparatus 200 to connect the display apparatus 100 and the portable apparatus 200 in the Wi-Fi direct scheme. Also, a remote controller that may be operated by a user input may be used for the display apparatus 100 to connect the display apparatus 100 and the portable apparatus 200 in the Wi-Fi direct scheme. The remote controller may perform control so that the display apparatus 100 and the portable apparatus 200 are connected in the Wi-Fi direct scheme using at least one of provided keys (including buttons), a touchpad, a microphone that may receive a voice of the user, and a sensor that may recognize a motion of the remote controller.

Embodiments of the present disclosure will be described in detail below.

Figure 2:
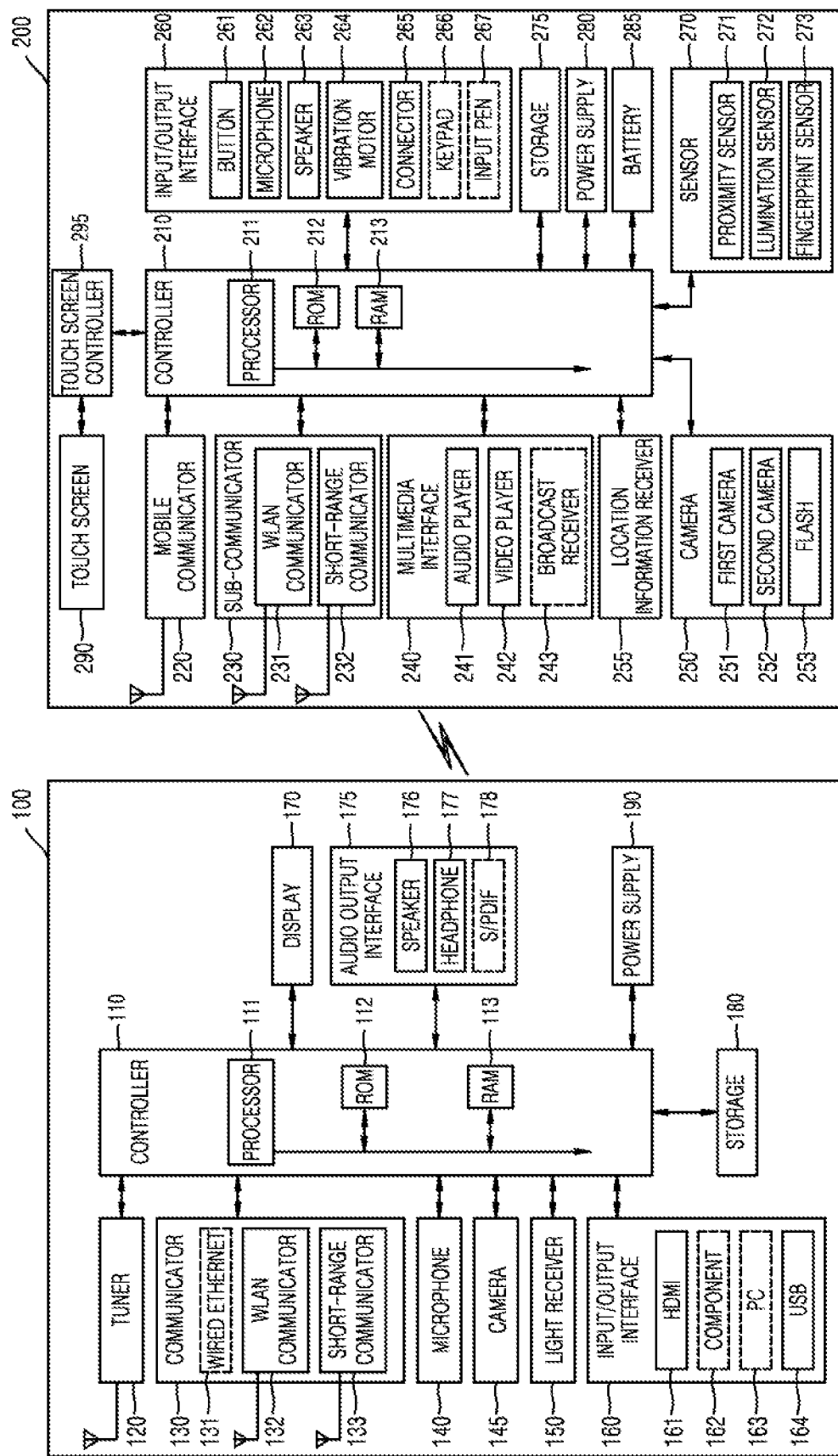
FIG. 2 is a schematic block diagram illustrating a display apparatus and a portable apparatus according to an exemplary embodiment of the present disclosure.

FIG. 2 is a schematic block diagram illustrating a display apparatus and a portable apparatus according to an exemplary embodiment of the present disclosure.

Referring to FIG. 2, the display apparatus 100 may be connected to the portable apparatus 200 through a communicator 130 or an input/output interface 160 in a wired or wireless manner. The display apparatus 100 and one or more portable apparatuses 200 may be connected to each other in the Wi-Fi direct scheme.

The display apparatus 100 includes a display 170, and may additionally include one of a tuner 120, the communicator 130, and the input/output interface 160, or a combination of the tuner 120, the communicator 130, and the input/output interface 160. The display apparatus 100 having the display 170 may be electrically connected to a separate device having a tuner (e.g., a set-top box or the like).

The display apparatus 100 includes the tuner 120, the communicator 130, a microphone 140, a camera 145, a light receiver 150, the input/output interface 160, the display 170, an audio output interface 175, a storage 180, and a power supply 190. The display apparatus 100 may include a sensor (e.g., an illumination sensor and the like) that senses an internal state or an external state of the display apparatus 100.

A controller 110 includes a processor 111. Also, the controller 110 may further include a read only memory (ROM) (or a non-volatile memory) 112 in which a control program for controlling the display apparatus 100 is stored, and a random access memory (RAM) (or a volatile memory) 113 which stores a signal or data input from the outside of the display apparatus 100 or is used as a storage region corresponding to various applications and/or tasks performed in the display apparatus 100.

The controller 110 may control overall operation of the display apparatus 100 and signal flow between the internal components 110 to 190 of the display apparatus 100, and may process data. The controller 110 controls power supplied from the power supply 190 to the internal components 110 to 190.

The processor 111 may include a graphics processing unit (GPU) for processing graphics corresponding to an image or a video. The processor 111 may be implemented as a system on chip (SoC) including a core and a GPU. Also, the processor 111 may be implemented as an SoC including at least one of the ROM 112 and the RAM 113.

The processor 111 may include a plurality of processors. The plurality of processors may include a main processor (central processing unit) operating in a state of the display apparatus 100, that is, in a pre-power on mode for preparing the display apparatus 100 to be available and/or a normal mode for displaying a broadcast screen, and a sub processor operating in another state of the display apparatus 100, that is, in a standby mode (e.g., the power of the display apparatus 100 is turned off and a plug thereof is input into a socket). The display apparatus 100 in the pre-power on mode may perform a preparatory task to be activated and display various kinds of content.

In the pre-power on mode and/or the normal mode, the controller 110 including the main processor may operate. Also, in the standby mode, the controller 110 including the sub processor may operate. The plurality of processors may further include a sensor processor that controls a sensor. The processor 111, the ROM 112, and the RAM 113 may be connected to each other through an internal bus.

The controller 110 controls the communicator 130, which is wirelessly connected to at least one of an AP and the portable apparatus 200, and the storage 180, which stores first AP connection information including information corresponding to the connection between the display apparatus 100 and the AP, receives second AP connection information including information on a connection between the portable apparatus 200 and the AP or another AP from the portable apparatus 200 that may be connected to in the Wi-Fi direct scheme, determines a P2P operating channel between the display apparatus 100 and the portable apparatus 200 using the first AP connection information and the second AP connection information, and performs control so that the display apparatus 100 and the portable apparatus 200 are connected in the Wi-Fi direct scheme through the determined P2P operating channel.

When the display apparatus 100 and the AP are wirelessly connected, the controller 110 may perform control so that the first AP connection information is generated.

The controller 110 may perform control so that at least one of whether the display apparatus 100 and the AP are connected, an operating channel frequency band between the display apparatus 100 and the AP, and an operating channel number between the display apparatus 100 and the AP is included in the first AP connection information.

The controller 110 may perform control so that the first AP connection information is included in vendor-specific information element (IEs) corresponding to the connection between the display apparatus 100 and the AP.

The controller 110 may perform control so that the first AP connection information is included in vendor-specific capability attributes corresponding to the connection between the display apparatus 100 and the AP.

The controller 110 may perform control so that the second AP connection information is parsed, and the second AP connection information may include at least one of whether the portable apparatus 200 and the AP are connected, whether the portable apparatus 200 and another AP are connected, an operating channel frequency band between the portable apparatus 200 and the AP, an operating channel frequency band between the portable apparatus 200 and the other AP, an operating channel number between the portable apparatus 200 and the AP, and an operating channel number between the portable apparatus 200 and the other AP.

The controller 110 may perform control so that vendor-specific IEs corresponding to the second AP connection information are parsed.

The controller 110 may perform control so that vendor-specific capability attributes corresponding to the second AP connection information are parsed.

The controller 110 may perform control so that the P2P operating channel is set differently according to one of whether the display apparatus 100 and the AP are connected, whether the portable apparatus 200 and the AP are connected, and whether the portable apparatus 200 and another AP are connected.

The controller 110 may perform control so that the P2P operating channel is set differently according to one of a frequency band in which the display apparatus 100 and the AP are connected, a frequency band in which the portable apparatus 200 and the AP are connected, and a frequency band in which the portable apparatus 200 and another AP are connected.

The controller 110 may perform control so that the P2P operating channel is set to prioritize the frequency band of 5 GHz among the frequency band of 5 GHz and the frequency band of 2.4 GHz.

The controller 110 may perform control so that the P2P operating channel is set to prioritize SCC among SCC and MCC.

The controller 110 may perform control using the first AP connection information and the second AP connection information so that the display apparatus 100 is set as the GO.

In exemplary embodiments of the present disclosure, the phrase "controller of the display apparatus 100" includes the processor 111, the ROM 112, and the RAM 113 of the display apparatus 100.

The controller 110 has been shown and described above as including the processor 111, the ROM 112, and the RAM 113 of the display apparatus 100, but is not limited thereto. For example, the phrase "controller of the display apparatus 100" may be used with a meaning that includes a main processor, a sub processor, the ROM 112, and the RAM 113 of the display apparatus 100. The phrase "controller of the display apparatus 100" may be used with a meaning that includes a sub processor, the ROM 112, and the RAM 113 of the display apparatus 100. Also, the phrase "controller of the display apparatus 100" may be used with a meaning that includes a main processor, a sub processor, a sensor processor, the ROM 112, and the RAM 113. The controller 110 may be implemented as a microprocessor, an SoC, or integrated circuit (IC) logic.

Those of ordinary skill in the art will easily understand that a variety of configurations and operations of the controller 110 may be implemented.

The tuner 120 may tune the display apparatus 100 to a frequency of a channel to be received among frequency components of a broadcast signal received in a wired/wireless manner by amplifying, mixing, resonating, etc. the broadcast signal, thereby selecting the frequency. The broadcast signal includes video, audio, and additional data (e.g., an electronic program guide (EPG)).

The tuner 120 may receive video, audio, and additional data in a frequency band corresponding to a channel number (e.g., a cable broadcast channel number 506) corresponding to a user input. The tuner 120 may receive a broadcast signal from various sources, such as ground wave broadcasting, cable broadcasting, satellite broadcasting, and the like. The tuner 120 may also receive a broadcast signal from various sources, such as analog broadcasting, digital broadcasting, and the like.

The tuner 120 may be implemented as an all-in-one type together with the display apparatus 100 or as a separate device (e.g., a set-top box or a tuner connected to the input/output interface 160) having a tuner unit that is electrically connected to the display apparatus 100.

The communicator 130 may connect the display apparatus 100 to the portable apparatus 200 or the remote controller under control of the controller 110. The communicator 130 may connect the display apparatus 100 and the portable apparatus 200 in the Wi-Fi direct scheme by a user input. The communicator 130 may also connect the display apparatus 100 to the portable apparatus 200 or the AP 300 in the Wi-Fi direct (or Wi-Fi) scheme by a user input. Also, the communicator 130 may receive AP connection information of the portable apparatus 200 transmitted from the portable apparatus 200 under control of the controller 110.

The communicator 130 (e.g., transceiver) may include one of a wired Ethernet 131, a wireless local area network (WLAN) communicator 132, and a short-range communicator 133, or a combination of the wired Ethernet 131, the WLAN communicator 132, and the short-range communicator 133 according to performance and a structure of the display apparatus 100.

The WLAN communicator 132 may be a component for performing Wi-Fi direct communication with the portable apparatus 200. Also, the WLAN communicator 132 may be a component for performing Wi-Fi communication or Wi-Fi direct communication with the AP 300.

The WLAN communicator 132 may perform a device discovery process due to the controller 110.

The short-range communicator 133 may further include a Bluetooth communication interface, a Bluetooth low energy (BLE) communication interface, an infrared data association (IrDA) communication interface, an ultra-wideband (UWB) communication interface, a magnetic security transmission (MST) interface, a near field communication (NFC) interface, and the like.

The microphone 140 receives speech uttered by the user. The microphone 140 may convert the received speech into an electrical signal and output the electrical signal to the controller 110. The speech of the user may include, for example, a speech corresponding to a menu of the display apparatus 100 or control of a function of the display apparatus 100.

The microphone 140 may be implemented to be integrated with the display apparatus 100 or separated from the display apparatus 100. The separated microphone 140 may be electrically connected to the display apparatus 100 through the communicator 130 or the input/output interface 160. The camera 145 captures a video (e.g., consecutive frames) within a camera recognition range. The captured video may be used for recognizing a motion of the user. The motion of the user may include, for example, the presence of the user (e.g., an appearance of the user within the camera recognition range), the user's face and expression, body parts of the user, such as a hand, a fist, and a finger, a motion of a body part of the user, and the like.

The camera 145 may be positioned at one of an upper end, a lower end, a left portion, and a right portion of the display apparatus 100. The camera 145 may be implemented to be integrated with the display apparatus 100 or separated from the display apparatus 100. An electronic device including the separated camera may be electrically connected to the display apparatus 100 through the communicator 130 or the input/output interface 160.

The light receiver 150 may receive a light signal (e.g., infrared signal) (including control information) output from the remote controller through a light window.

The light receiver 150 may receive a light signal corresponding to a user input (e.g., a touch, a press, a touch gesture, a speech, or a motion) from the remote controller. Control information may be extracted from the received light signal. The received light signal and/or the extracted control information may be transmitted to the controller 110.

The input/output interface 160 receives content from the outside of the display apparatus 100 under control of the controller 110. The content may include, for example, a video, an image, text, or a web document. Also, the content may include a video including an advertisement, an image including an advertisement, or a web document including an advertisement.

The input/output interface 160 may include one of a high-definition multimedia interface (HDMI) port 161, a component jack 162, a personal computer (PC) port 163, and a universal serial bus (USB) jack 164 supporting content reception. The input/output interface 160 may include a combination of the HDMI port 161, the component jack 162, the PC port 163, and the USB jack 164.

Those of ordinary skill in the art will easily understand that there may be additional interfaces included in the input/output interface 160 according to the performance and structure of the display apparatus 100.

The display 170 displays video content included in a broadcast signal received through the tuner 120 under control of the controller 110. The display 170 may display content (e.g., video content) input through the communicator 130 or the input/output interface 160. The display 170 may output content stored in the storage 180 under control of the controller 110. Also, the display 170 may display a voice UI for performing a speech recognition task corresponding to speech recognition, or a motion UI for performing a motion recognition task corresponding to motion recognition. For example, the voice UI may include a voice command guide, and the motion UI may include a motion command guide.

In exemplary embodiments of the present disclosure, the phrase "screen of the display apparatus 100" may be used with a meaning that includes the display 170 of the display apparatus 100.

The display 170 according to an exemplary embodiment of the present disclosure may display visual feedback corresponding to a setting of the P2P operating channel between the display apparatus 100 and the portable apparatus 200. The display 170 according to another exemplary embodiment of the present disclosure may be separated from the display apparatus 100. The display 170 may be electrically connected to the display apparatus 100 through the input/output interface 160 of the display apparatus 100.

The audio output interface 175 outputs audio content included in a broadcast signal received through the tuner 120 under control of the controller 110. The audio output interface 175 may output audio content (e.g., corresponding to a speech or a sound) input through the communicator 130 or the input/output interface 160. Also, the audio output interface 175 may output an audio file stored in the storage 180 under control of the controller 110.

The audio output interface 175 may include one of a speaker 176, a headphone output terminal 177, and a Sony/Philips digital interface format (S/PDIF) output terminal 178. Also, the audio output interface 175 may include a combination of the speaker 176, the headphone output terminal 177, and the S/PDIF output terminal 178.

The audio output interface 175 according to an exemplary embodiment of the present disclosure may output auditory feedback corresponding to a setting of the P2P operating channel between the display apparatus 100 and the portable apparatus 200.

The storage 180 (e.g., memory) may store various data, programs, or applications for operating and controlling the display apparatus 100 when executed under control of the controller 110. The storage 180 may store input/output signals or data corresponding to an operation of the tuner 120, the communicator 130, the microphone 140, the camera 145, the light receiver 150, the input/output interface 160, the display 170, the audio output interface 175, and the power supply 190.

The storage 180 may store a control program for controlling the display apparatus 100 and the controller 110, an application initially provided by a manufacturer or downloaded from the outside, a GUI related to an application, objects for providing a GUI (e.g., images, text, icons, buttons, etc.), user information, documents, databases (DBs), or related data.

The storage 180 may include a broadcast receiving module, a channel control module, a volume control module, a communication control module, a speech recognition module, a motion recognition module, a light receiving module, a display control module, an audio control module, an external input control module, a power control module, a speech DB, or a motion DB.

The modules and the DBs may be implemented in the form of software in the display apparatus 100 to perform a broadcast-reception control function, a channel control function, a volume control function, a communication control function, a speech recognition function, a motion recognition function, a light-reception control function, a display control function, an audio control function, an external input control function, or a power control function.

The controller 110 may perform a function of the display apparatus 100 using the software stored in the storage 180.

The storage 180 may store the first AP connection information corresponding to the connection between the display apparatus 100 and the AP 300.

The storage 180 may store the second AP connection information received from the portable apparatus 200.

The storage 180 may store a video, an image or text corresponding to visual feedback.

The storage 180 may store a sound corresponding to auditory feedback.

The storage 180 may store a feedback provision time (e.g., 300 ms) of feedback provided to the user.

In exemplary embodiments of the present disclosure, the term "storage" may be used with a meaning that includes the storage 180, the ROM 112 and the RAM 113 of the controller 110, a storage implemented as an SoC, a memory card (e.g., a micro secure digital (SD) card or a USB memory) installed in the display apparatus 100, and an external storage (e.g., a USB memory or the like) connectable to the USB jack 164 of the input/output interface 160. Also, the storage may include a non-volatile memory, a volatile memory, a hard disk drive (HDD), or a solid state drive (SDD).

The power supply 190 supplies power input from an external power source to the components 110 to 190 in the display apparatus 100 under control of the controller 110. The power supply 190 may supply power input from one or more batteries positioned in the display apparatus 100 to the internal components 110 to 190 under control of the controller 110.

At least one component may be added to, modified among, or removed from (e.g., at least one of boxes indicated by dashed lines) the components (e.g., 110 to 190) shown in the display apparatus 100 of FIGS. 1 and 2 according to performance and/or a type of the display apparatus 100. Also, those of ordinary skill in the art will easily understand that positions of the components (e.g., 110 to 190) may be changed according to performance or a structure of the display apparatus 100.

A case in which an operating channel of a display apparatus is set will be illustrated in detail below.

Referring to FIG. 2, the portable apparatus 200 may be connected to the display apparatus 100 in a wired or wireless manner using at least one of a mobile communicator 220, a sub-communicator 230, and a connector 265. The portable apparatus 200 may be connected to the display apparatus 100 in the Wi-Fi direct scheme. Also, the portable apparatus 200 may be determined as one of a GO and a group client to be connected with the display apparatus 100 in the Wi-Fi direct scheme. The portable apparatus 200 may be an apparatus that includes a display and may transmit to or receive data (or content) from the display apparatus 100 through the communicator 220 or 230 supporting the Wi-Fi direct scheme.

The portable apparatus 200 may be implemented as a cellular phone, a smart phone, a camera, a Moving Picture Experts Group (MPEG) audio layer 3 (MP3) player, a video player, a tablet PC, a wearable device that may be worn on (attached to, or implanted into) a body, an electronic blackboard (not shown), a home appliance (e.g., a refrigerator, an air conditioner, a vacuum, and the like), and the like. In exemplary embodiments of the present disclosure, the portable apparatus 200 may denote an electronic apparatus having a communicator that supports one or both of the Wi-Fi scheme and the Wi-Fi direct scheme.

The controller 210 may include a processor 211, a ROM 212, which stores a control program for controlling the portable apparatus 200, and a RAM 213, which stores a signal or data input from the outside of the portable apparatus 200 and is used as a storage region corresponding to various applications and/or tasks performed in the portable apparatus 200.

The controller 210 may function to control overall operation of the portable apparatus 200 and signal flow between internal components 220 to 295 of the portable apparatus 200, and to process data. The controller 210 controls a supply of power to the internal components 220 to 295 using a power supply 280.

The controller 210 may control the mobile communicator 220, the sub-communicator 230, a multimedia interface 240, a camera 250, a location information receiver 255, an input/output interface 260, a sensor 270, a storage 275, the power supply 280, a touch screen 290, and a touch screen controller 295.

In exemplary embodiments of the present disclosure, the term "controller 210" may include the processor 211, the ROM 212, and the RAM 213. Additional memory (e.g., RAM, ROM, etc.), apart from memory of the controller 210, may also be provided in the portable apparatus for execution of software applications, operating systems, and the like.

The mobile communicator 220 may connect to a mobile communication network using one or more antennas under control of the controller 210. The mobile communicator 220 may transmit/receive wireless signals for a voice call, a video call, a short message service (SMS), a multimedia message service (MMS), and data communication to/from a cellular phone, a smart phone, a tablet PC, or another portable apparatus having a contactable phone number. The sub-communicator 230 may connect to the outside under control of the controller 210. The sub-communicator 230 may be connected to the display apparatus 100 in the Wi-Fi direct scheme under control of the controller 210. Also, the sub-communicator 230 may be connected to the AP 300 in the Wi-Fi scheme under control of the controller 210.

The sub-communicator 230 may include one or both of a WLAN communicator 231 and a short-range communicator 232.

Since the WLAN communicator 231 and the short-range communicator 232 of the portable apparatus 200 are substantially similar to the WLAN communicator 132 and the short-range communicator 133 of the display apparatus 100, redundant descriptions will be omitted.

The multimedia interface 240 may include an audio player 241, a video player 242, or a broadcast receiver 243.

The audio player 241 may play an audio source (e.g., an audio file whose file extension is .mp3, .wma, .ogg, .wav, or the like) that is previously stored in the storage 275 of the portable apparatus 200 or received from the outside using an audio codec under control of the controller 210.

According to exemplary embodiments of the present disclosure, the audio player 241 may play auditory feedback (e.g., an output of an audio source stored in the storage 275) corresponding to a response to a transmission of a photograph to the display apparatus 100 using the audio codec.

The video player 242 may play a digital video source (e.g., a video file whose file extension is .mpeg, .mpg, .mp4, .avi, .mov, .mkv, or the like) that is stored in the storage 275 of the portable apparatus 200 or received from an external source using a video codec under control of the controller 210. A multimedia application that may be installed in the portable apparatus 200 may play an audio source or a video source using the audio codec and/or the video codec.

According to exemplary embodiments of the present disclosure, the video player 242 may play visual feedback (e.g., an output of a video source stored in the storage 275) corresponding to a setting of the P2P operating channel between the display apparatus 100 and the portable apparatus 200 using the video codec under control of the controller 210.

The broadcast receiver 243 may receive a broadcast signal (e.g., a TV broadcast signal, a radio broadcast signal, or a data broadcast signal) and additional broadcast information (e.g., an EPG or an electronic service guide (ESG)) sent from an external broadcasting station through an antenna under control of the controller 210. Also, the controller 210 may play the received broadcast signal and additional broadcast information using the touch screen 290, the video codec, and the audio codec.

According to performance or a structure of the portable apparatus 200, the multimedia interface 240 may exclude the broadcast receiver 243 and include the audio player 241 and the video player 242. Also, the controller 210 may include the audio player 241 or the video player 242 of the multimedia interface 240.

The camera 250 may include one or both of a first camera 251 and a second camera 252, which capture a still image or a video under control of the controller 210, on a front side and a rear side, respectively. Also, the first camera 251 or the second camera 252 may include an auxiliary light source (e.g., a flash 253) which provides an amount of light necessary for photography.

From a plurality of global positioning system (GPS) satellites in orbit around the Earth, the location information receiver 255 periodically receives signals (e.g., orbit information of the GPS satellites, time information of the satellites, a navigation message, etc.).

When outdoors, the portable apparatus 200 may calculate locations of the portable apparatus 200 and the plurality of GPS satellites using signals received from the plurality of GPS satellites, and calculate a distance and a moving speed using a difference between transmission and reception times.

When indoors, the portable apparatus 200 may detect a location or a moving speed thereof using an AP. Also, the portable apparatus 200 may detect the location or the moving speed of the portable apparatus located indoors using a wireless beacon. Those of ordinary skill in the art will easily understand that it is possible to detect an indoor location of the portable apparatus 200 using various methods as well as the aforementioned methods.

The input/output interface 260 may include at least one of one or more buttons 261, a microphone 262, a speaker 263, a vibration motor 264, the connector 265, a keypad 266, and an input pen 267.

The buttons 261 may be implemented as touch buttons on a bezel outside the touch screen 290 as well as physical buttons.

The microphone 262 generates an electrical signal from a voice or sound received from the outside under control of the controller 210. The electrical signal generated by the microphone 262 may be converted by the audio codec and stored in the storage 275 or output through the speaker 263.

One or more speakers 263 may be positioned on a front side, lateral sides, and a rear side of the portable apparatus 200. According to exemplary embodiments of the present disclosure, the speaker 263 may output auditory feedback corresponding to a setting of the P2P operating channel between the display apparatus 100 and the portable apparatus 200 under control of the controller 210.

The vibration motor 264 may convert an electrical signal into mechanical vibrations under control of the controller 210. The vibration motor 264 may include a linear vibration motor, a bar-type vibration motor, a coin-type vibration motor, or a piezoelectric vibration motor. According to exemplary embodiments of the present disclosure, the vibration motor 264 may output tactile feedback corresponding to a setting of the P2P operating channel between the display apparatus 100 and the portable apparatus 200 under control of the controller 210.

The connector 265 may be used as an interface for connecting the portable apparatus 200 and an external device or a power source.

The keypad 266 may receive a key input of the user. The keypad 266 includes a physical keypad formed on the front side of the portable apparatus 200, a virtual keypad displayed in the touch screen 290, and a physical keypad which is connectable to the portable apparatus 200 in a wireless or wired manner.

The user may touch an object (e.g., a menu, text, an image, a video, a figure, an icon, and a shortcut icon) or content displayed in (constituting) a home screen 291 of the touch screen 290 or a screen (e.g., a memo screen, a notepad screen, a calendar screen, etc.) of a writing/drawing application with the input pen 267. The user may input characters or the like by touching the touch screen 290 in a capacitive, resistive, or electromagnetic resonance (EMR) manner or using a displayed virtual keypad with the input pen 267.

The sensor 270 includes at least one sensor that detects a state of the portable apparatus 200. For example, the sensor 270 may include a proximity sensor 271 that detects whether the user approaches the portable apparatus 200, an illumination sensor 272 that detects the amount of light around the portable apparatus 200, and a fingerprint sensor 273 that detects a fingerprint of the user.

The sensor 270 may further include a speed sensor, a gravity sensor, or a heartbeat sensor that detects the user's heartbeat.

The at least one sensor included in the sensor 270 detects the state of the portable apparatus 200, generates an electrical signal corresponding to the detected state, and transmits the electrical signal to the controller 210. Those of ordinary skill in the art will easily understand that the number of sensors included in the sensor 270 may be increased or decreased according to performance of the portable apparatus 200.

The storage 275 may store signals or data input/output according to operations of the mobile communicator 220, the sub-communicator 230, the multimedia interface 240, the camera 250, the location information receiver 255, the input/output interface 260, the sensor 270, and the touch screen 290 under control of the controller 210. The storage 275 may store a control program for controlling the portable apparatus 200 or the controller 210, a GUI related to an application provided by a manufacturer or downloaded from the outside, images for providing a GUI, user information, documents, DBs, or related data.

The storage 275 may store second AP connection information corresponding to one of whether or not the portable apparatus 200 and the AP 300 are connected and whether or not the portable apparatus 200 and another AP 301 are connected.

The storage 275 may store visual feedback (e.g., a video source or the like) which is recognizable by the user and output to the touch screen 290, auditory feedback (e.g., a sound source or the like) which is recognizable by the user and output from the speaker 263, and tactile feedback (e.g., a haptic pattern or the like) which is recognizable by the user and output from the vibration motor 264 according to a setting of the P2P operating channel between the display apparatus 100 and the portable apparatus 200.

The storage 275 may store a feedback provision time (e.g., 300 ms) of feedback provided to the user.

In embodiments of the present disclosure, the term "storage" may be used with a meaning that includes the storage 275, the ROM 212 and the RAM 213 in the controller 210, or a memory card (e.g., a micro SD card or a memory stick; not shown) installed in the portable apparatus 200.

The power supply 280 may supply power to the components 210 to 295 positioned in the portable apparatus 200 under control of the controller 210. The power supply 280 may supply power input from an external power source to the portable apparatus 200 through a cable connected to the connector 265 under control of the controller 210. Also, the power supply 280 may wirelessly charge (e.g., in a magnetic resonance manner, an electromagnetic wave manner, or a magnetic induction manner) a battery under control of the controller 210.

The touch screen 290 includes a touch panel that receives a touch input and a display panel for displaying a screen. The touch screen 290 may provide GUIs corresponding to various services (e.g., a voice call, a video call, data transmission, broadcast reception, photography, playing a video, or executing an application) to the user. The touch screen 290 may receive a single touch or multiple touches through the user's body (e.g., fingers including the thumb) or the input pen 267.

The display panel has multiple pixels and displays an image through the pixels. For example, the display panel may be a liquid crystal display (LCD) panel, an OLED panel, a LED panel, and the like. The display panel may display various operating states of the portable apparatus 200, various images, and a plurality of objects according to an execution of an application or a service.

The touch screen 290 may be implemented as, for example, a resistive type, a capacitive type, an infrared type, or an ultrasonic wave type. Also, the touch screen 290 may include an EMR type. An EMR touch screen may further include an additional EMR touch panel for receiving an input of an input pen having a resonance circuit which resonates with an EMR loop coil.

The touch screen 290 according to exemplary embodiments of the present disclosure may display visual feedback corresponding to a setting of the P2P operating channel between the display apparatus 100 and the portable apparatus 200 under control of the controller 210.

The touch screen controller 295 converts an analog signal corresponding to a single touch or multiple touches received from the touch screen 290 into a digital signal and transmits the digital signal to the controller 210. The controller 210 may calculate X and Y coordinates corresponding to a touch position on the touch screen 290 using the digital signal received from the touch screen controller 295.

The controller 210 may control the touch screen 290 using the digital signal received from the touch screen controller 295.

The touch screen controller 295 may be implemented as one or more touch screen controllers 295. The touch screen controller 295 may be included in the controller 210 according to performance or a structure of the portable apparatus 200.

The portable apparatus 200 may have a plurality of touch screens rather than one touch screen. Each touch screen may be positioned in a housing, and the housings may be connected to each other by a hinge. Also, a plurality of flexible touch screens may be positioned in one housing. The plurality of flexible touch screens may include one display panel and a plurality of touch panels. The plurality of flexible touch screens may include one touch panel corresponding to a plurality of display panels. Also, the plurality of flexible touch screens may include a plurality of touch panels corresponding to a plurality of display panels.

Those of ordinary skill in the art will easily understand that at least one component may be added to or removed from (e.g., at least one of boxes indicated by dotted lines) the components of the portable apparatus 200 shown in FIG. 2 according to performance of the portable apparatus 200.

Figure 3:
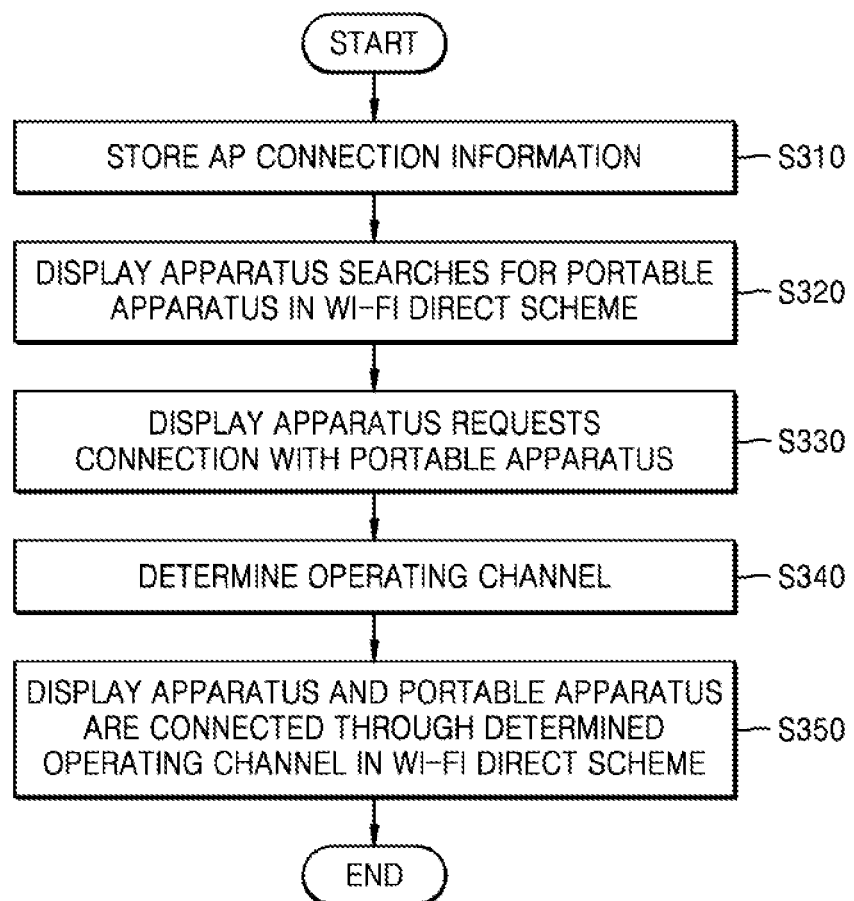
FIG. 3 is a schematic flowchart illustrating a method of setting an operating channel of a display apparatus according to an exemplary embodiment of the present disclosure.

FIG. 3 is a schematic flowchart illustrating a method of setting an operating channel of a display apparatus according to an exemplary embodiment of the present disclosure.

FIGS. 5A to 5G are diagrams illustrating a method of setting an operating channel of a display apparatus according to an exemplary embodiment of the present disclosure.

In operation S310 of FIG. 3, AP connection information is stored.

Figure 5A:
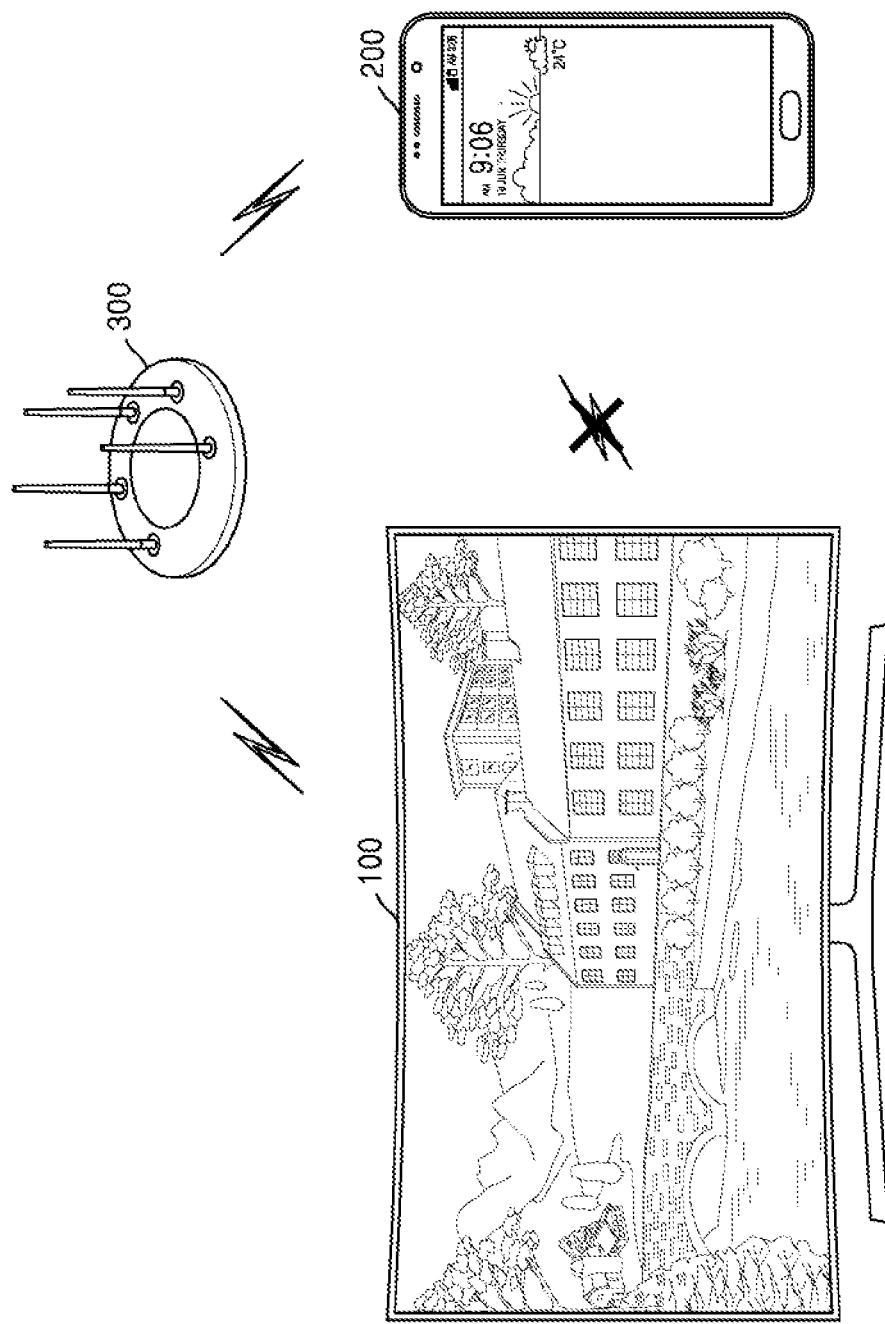
FIGS. 5A to 5G are diagrams illustrating a method of setting an operating channel of a display apparatus according to an exemplary embodiment of the present disclosure.

Referring to FIG. 5A, a user may search for the AP 300, which may be connected to in a wireless manner (e.g., including a Wi-Fi scheme) through a network setting of settings of the display apparatus 100 using a remote controller. The display apparatus 100 may be connected to the AP 300 found by the user. One (e.g., the AP 300) or more (e.g., the AP 300 and another AP) APs may be wirelessly connected to the display apparatus 100.

When the display apparatus 100 is connected to the AP 300 through the communicator 130, the controller 110 of the display apparatus 100 may store AP connection information corresponding to the AP connection of the display apparatus 100. Also, the controller 110 may store the AP connection information through an application executed according to a connection between the display apparatus 100 and the AP 300 (or another AP).

According to an exemplary embodiment, the display apparatus 100 may determine whether it is connected to an AP, update information resulting from the determination, and store the updated information. When the display apparatus 100 is connected to an AP, the display apparatus 100 may also store information on a connected channel. The stored information may be used as a condition for determining an operating channel when the display apparatus 100 is connected in the Wi-Fi direct manner and becomes a GO. According to an exemplary embodiment, when attempting a Wi-Fi direct connection, the display apparatus 100 may determine whether a connection to an AP exists.

In exemplary embodiments of the present disclosure, a connection between the display apparatus 100 and an AP may include at least one of the connection between the display apparatus 100 and the AP 300 and a connection between the display apparatus 100 and another AP. The display apparatus 100 may store AP connection information corresponding to a connected AP.

In exemplary embodiments of the present disclosure, the AP connection information of the AP connected to the display apparatus 100 may be referred to as first AP connection information.

The controller 110 may store the AP connection information in the storage 180. The stored AP connection information may be used to set an operating channel in a Wi-Fi direct connection process.

Items included in the AP connection information stored in the storage 180 may include whether the display apparatus 100 and the AP 300 are connected, a basic service set identifier (BSSID) (or an SSID) of the AP 300, an operating channel frequency band (e.g., 2.4 GHz or 5 GHz) between the display apparatus 100 and the AP 300, an operating channel number between the display apparatus 100 and the AP 300, and the like. The aforementioned items included in the AP connection information are examples, and items included in the AP connection information are not limited thereto.

In exemplary embodiments of the present disclosure, the first AP connection information may have a format (e.g., a previously stored file or a file downloaded from an external source) that enables at least one of the controller 110 of the display apparatus 100 and the controller 210 of the portable apparatus 200 to determine (or analyze) whether a display apparatus and an AP are connected.

The controller 110 may include one (e.g., whether the display apparatus 100 is connected to an AP) or more (e.g., whether the display apparatus 100 is connected to an AP, the operating channel frequency band (e.g., 2.4 GHz or 5 GHz) between the display apparatus 100 and the AP 300, the operating channel number between the display apparatus 100 and the AP 300, and the like) of the items of the AP connection information in P2P IEs.

The controller 110 may include one (e.g., whether the display apparatus 100 is connected to an AP) or more (e.g., whether the display apparatus 100 is connected to an AP, the operating channel frequency band (e.g., 2.4 GHz or 5 GHz) between the display apparatus 100 and the AP 300, the operating channel number between the display apparatus 100 and the AP 300, and the like) of the items of the AP connection information in vendor-specific IEs. Also, the AP connection information may be added to vendor-specific capability attributes for defining P2P IEs under control of the controller 110. Further, an attribute format may be defined and generated.

The controller 110 may add the AP connection information to vendor-specific capability attributes, which are in a bitmap form. Whether the display apparatus 100 is connected to an AP corresponding to the AP connection information, the BSSID of the AP, an AP frequency band, an operating channel number between the display apparatus 100 and the AP, or the like may be added to AP capability attributes.

Table 1 below shows an example of P2P IEs (or vendor-specific IEs) stored in the display apparatus 100. Table 2 shows an example of vendor-specific capability attributes.

TABLE 1

Vendor-specific IE format

| Field | Size (octets) | Value | Description |
|---|---|---|---|
| TAG NUMBER | 1 | 0xDD | Vendor specific |
| TAG LENGTH | 1 | Variable | |
| OUI | 3 | 0x0000F0 | SAMSUNG Electronics |
| Vendor-specific OUI TYPE | 1 | 0X0C | Samsung Vendor-specific IE |
| Vendor-specific Data | variable | | One or more attributes appear in this vendor specific IE |

TABLE 2

Vendor-specific Capability Attribute

| Field | Size (octets) | Value | Description |
|---|---|---|---|
| Attribute ID | 1 | 0x00 | Vendor-specific Capability information |
| Length | 2 | 0x0001 | 1 byte |
| Vendor-specific Capability Bitmap | 1 | variable | 0 bit: AP connection (1: connected, 0: disconnected) 1 bit: AP frequency band (1: 5.0 GHz, 0: 2.4 GHz) 2 to 7 bits: reserved |

Here, the vendor-specific IEs may include a plurality of items indicating a tag number, a tag length, an organization unique identifier (OUI), a vendor-specific OUI type, vendor-specific data, etc., and those of ordinary skill in the art will easily understand that the vendor-specific IEs are not limited thereto, and may include items indicating various kinds of information. Also, the vendor-specific capability attributes may include a plurality of items indicating an attribute ID, a length, a vendor-specific capability bitmap, etc., and those of ordinary skill in the art will easily understand that the vendor-specific capability attributes are not limited thereto, and may include items indicating various kinds of information.

The controller 110 may newly define (or add) a capability bit corresponding to the AP connection information to a P2P capability attribute format in the P2P IEs. The capability bit corresponding to the AP connection information may be added to one of the reserved sixth to seventh bits. Also, the AP frequency band (or another item) may be added to one of the reserved sixth and seventh bits.

Table 3 below shows an example of a P2P capability attribute format stored in the display apparatus 100.

TABLE 3

P2P Capability attribute format

| Field | Size (octets) | Value | Description |
|---|---|---|---|
| Attribute ID | 1 | 0x00 | Vendor-specific capability information |
| Length | 2 | 0x0001 | 1 byte |
| Device Capability Bitmap | 3 | variable | 0 bit: Service Discovery 1 bit: P2P Client Discoverability 2 bit: Concurrent Operation 3 bit: P2P Infrastructure Managed 4 bit: P2P Device Limit 5 bit: P2P Invitation Procedure 6 bit: AP connection (1: connected, 0: disconnected) 7 bit: AP frequency band (1: 5.0 GHz, 0: 2.4 GHz) |
| Group Capability Bitmap | 1 | variable | |

Here, the P2P capability attribute format may include a plurality of items indicating an attribute ID, a length, a device capability bitmap, a group capability bitmap, etc., and those of ordinary skill in the art will easily understand that the P2P capability attribute format is not limited thereto, and may include items indicating various kinds of information.

When the display apparatus 100 is not connected to the AP 300 through the communicator 130 (e.g., when the AP 300 that may be connected to is not found), the controller 110 of the display apparatus 100 may generate and store AP connection information (e.g., blank AP connection information) corresponding to the AP 300 which has not been found. In this case, an item (e.g., whether the display apparatus 100 is connected to an AP, an AP frequency band, an operating channel number between the display apparatus 100 and the AP, or the like) of the AP connection information may be blank (or correspond to the binary number "0").

When the blank AP connection information corresponding to the AP 300 which has not been found is stored in the storage 180, the controller 110 may determine that the display apparatus 100 and the AP 300 are not connected (or that the AP 300 that may be connected to has not been found). The controller 110 may distinguish between the AP connection information and the blank AP connection information (e.g., through file names or parsing).

When the display apparatus 100 is not connected to the AP 300 through the communicator 130, the controller 110 may not generate the AP connection information. When there is no AP connection information in the storage 180, the controller 110 may determine that the display apparatus 100 and the AP 300 are not connected.

Referring to FIG. 5A, the portable apparatus 200 may be connected to the AP 300 or another AP in a wireless manner (e.g., including the Wi-Fi scheme). The portable apparatus 200 may be wirelessly connected to the AP 300 which is connected to the display apparatus 100 or another AP which is not connected to the display apparatus 100.

When the portable apparatus 200 is connected to the AP 300 or another AP, the controller 210 of the portable apparatus 200 may store the AP connection information. The controller 210 may store the AP connection information through an application which is executed according to a connection between the portable apparatus 200 and the AP 300 (or another AP).

In exemplary embodiments of the present disclosure, a connection between the portable apparatus 200 and an AP may include at least one of the connection between the portable apparatus 200 and the AP 300 and a connection between the portable apparatus 200 and another AP. The portable apparatus 200 may store AP connection information corresponding to a connected AP.

In exemplary embodiments of the present disclosure, the AP connection information of the AP connected to the portable apparatus 200 may be referred to as second AP connection information.

The AP connection information stored in the storage 275 may include items of information, such as whether the portable apparatus 200 is connected to an AP, a BSSID of the AP, an AP frequency band (e.g., 2.4 GHz or 5 GHz), an operating channel number between the portable apparatus 200 and the AP, and the like. The aforementioned items included in the AP connection information are exemplary, and the items included in the AP connection information are not limited thereto.

In exemplary embodiments of the present disclosure, the second AP connection information may have a format (e.g., a previously stored file or a file which may be downloaded from an external source) that enables at least one of the controller 210 of the portable apparatus 200 and the controller 110 of the display apparatus 100 to determine (or analyze) whether the portable apparatus 200 and an AP are connected.

Since descriptions of the second AP connection information of the portable apparatus 200 are substantially similar to those of the first AP connection information of the display apparatus 100, redundant descriptions may be omitted. Also, since the second AP connection information stored in the storage 275 is substantially similar to the first AP connection information (e.g., including Table 1 or Table 2) stored in storage 180 of the display apparatus 100, redundant descriptions may be omitted.

In FIG. 5A, the display apparatus 100 and the portable apparatus 200 are not wirelessly connected.

In operation S320 of FIG. 3, the display apparatus searches for the portable apparatus in the Wi-Fi direct scheme.

Figure 5B:
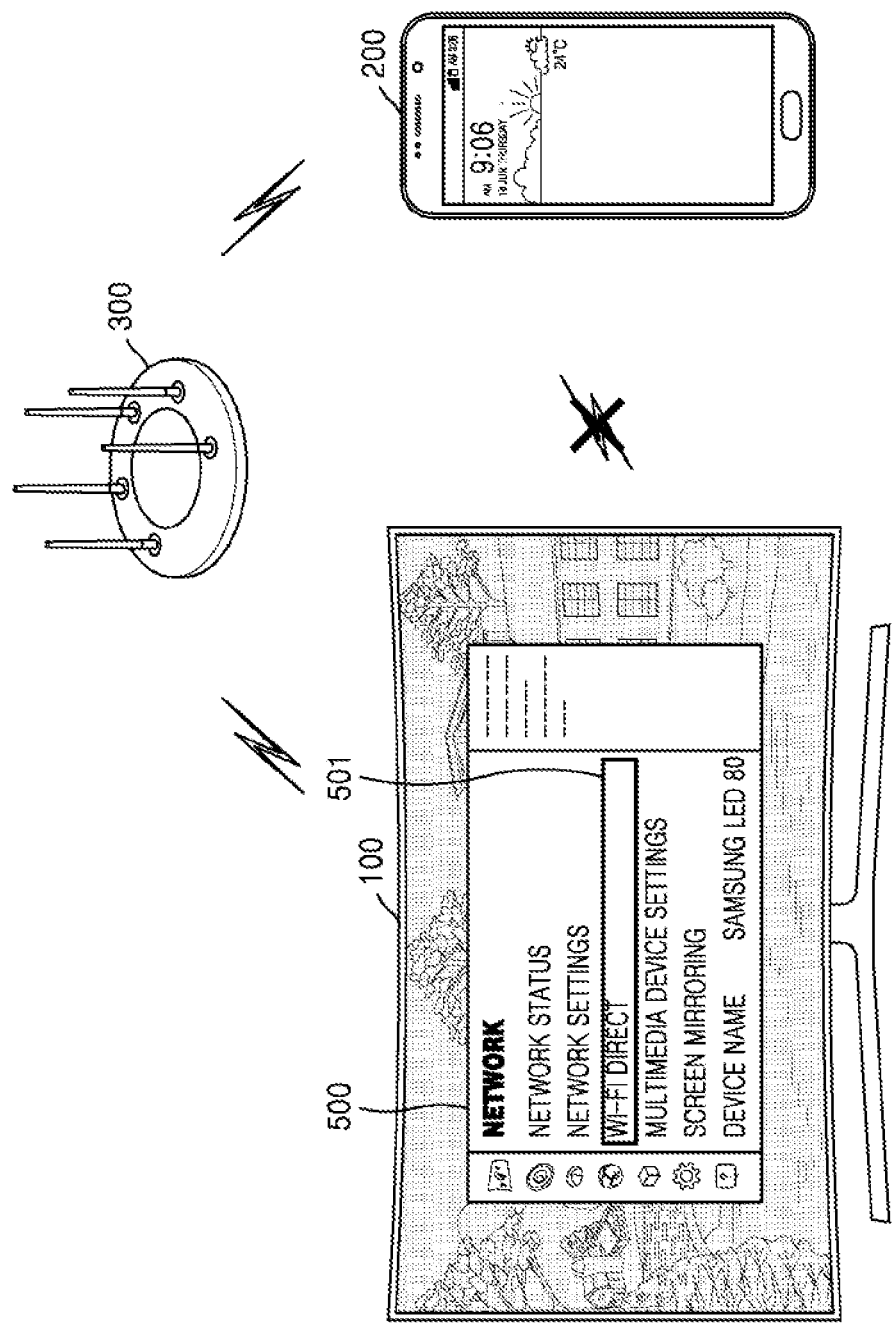
Figure 5C:
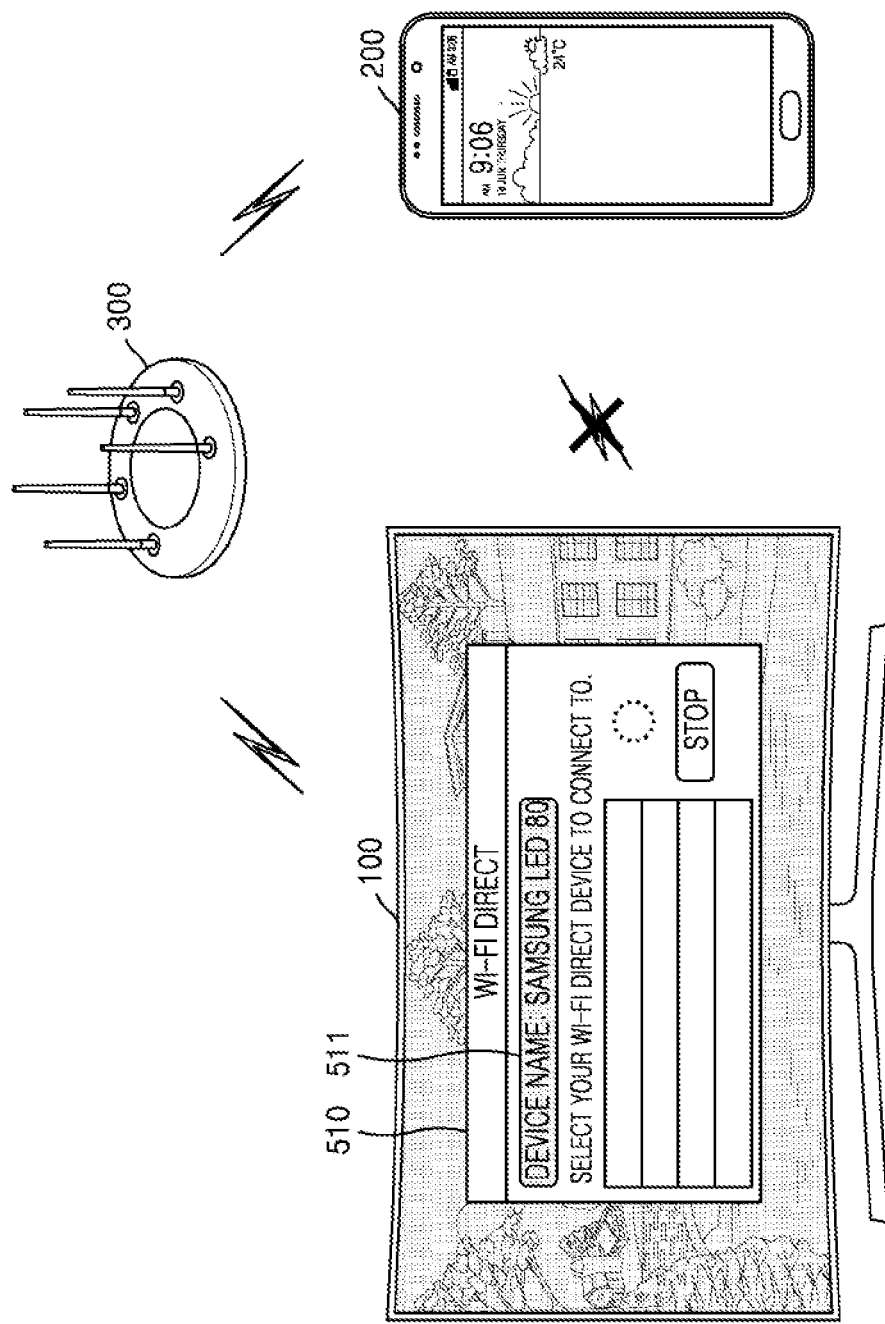
Figure 5D:
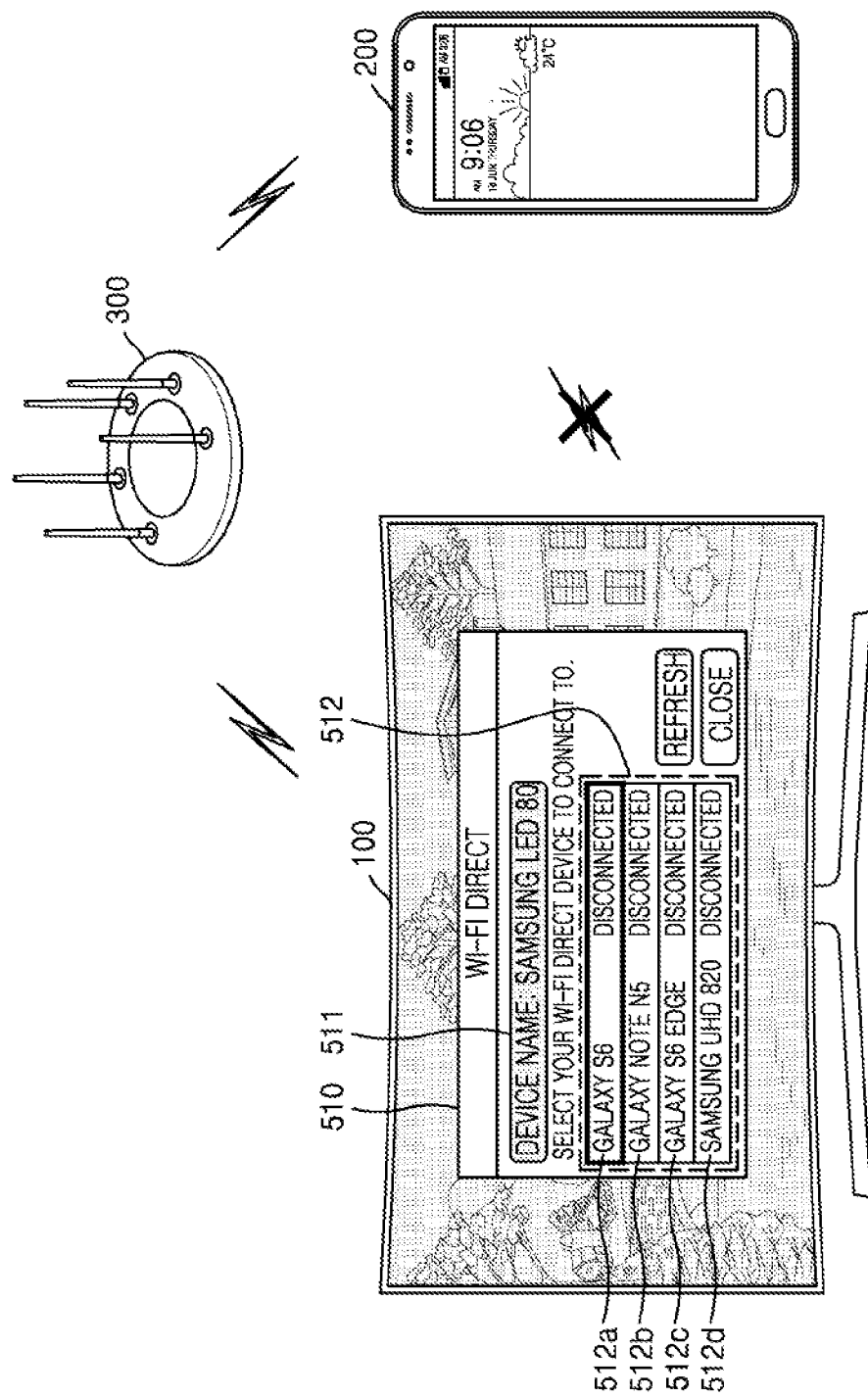

Referring to FIGS. 5B to 5D, the display apparatus 100 may search for other apparatuses including the portable apparatus 200 through the communicator 130. The display apparatus 100 may search for the portable apparatus 200, which is a connection target, in the Wi-Fi direct scheme. The display apparatus 100 may search for the portable apparatus 200 in the Wi-Fi direct scheme due to an input of the user (or the remote controller).

Referring to FIG. 5B, the user may select Wi-Fi direct 501 in a network setting 500 of settings displayed in the display apparatus 100 using the remote controller to search for the portable apparatus 200 to which to be connected.

Referring to FIG. 5C, the user may scan for the portable apparatus 200 that may be connected to in the Wi-Fi direct scheme. It is possible to see whether the portable apparatus 200 is scanned in a displayed Wi-Fi direct screen 510. An SSID of the display apparatus 100, a model name of the display apparatus 100, or an ID for distinguishing the display apparatus 100 from other devices may be displayed in a region 511 of the displayed Wi-Fi direct screen 510.

Referring to FIG. 5D, a list 512 including IDs corresponding to one or more devices found in the Wi-Fi direct scheme may be displayed on the displayed Wi-Fi direct screen 510. An ID 512a corresponding to the portable apparatus that is the connection target and also IDs 512b to 512d corresponding to connectable apparatuses may be displayed in the list 512.

In operation S320 of FIG. 3, the first AP connection information of the display apparatus 100 and the second AP connection information of the portable apparatus 200 may be separately transmitted. For example, the display apparatus 100 may receive and store the second AP connection information transmitted from the portable apparatus 200. Also, the portable apparatus 200 may receive and store the first AP connection information transmitted from the display apparatus 100.

The first AP connection information of the display apparatus 100 and the second AP connection information of the portable apparatus 200 may be transmitted in operation S320 of FIG. 3 and also in another operation (e.g., operation S330, operation S340, etc. of FIG. 3).

In operation S320 of FIG. 3, the portable apparatus 200 may search for the display apparatus 100 through the communicator 220 or 230.

In operation S330 of FIG. 3, the display apparatus requests a wireless connection from the portable apparatus.

Figure 5E:
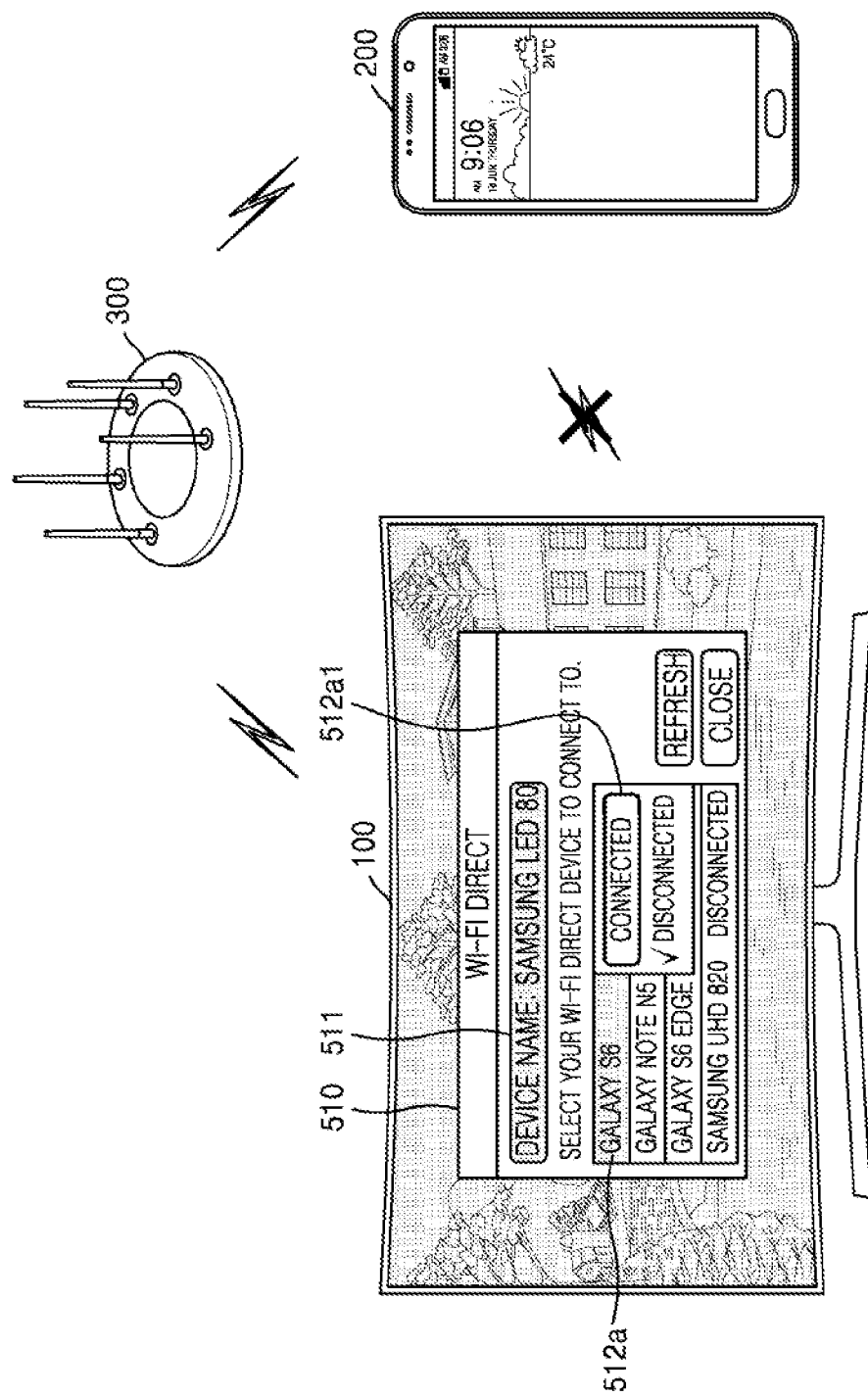
Figure 5F:
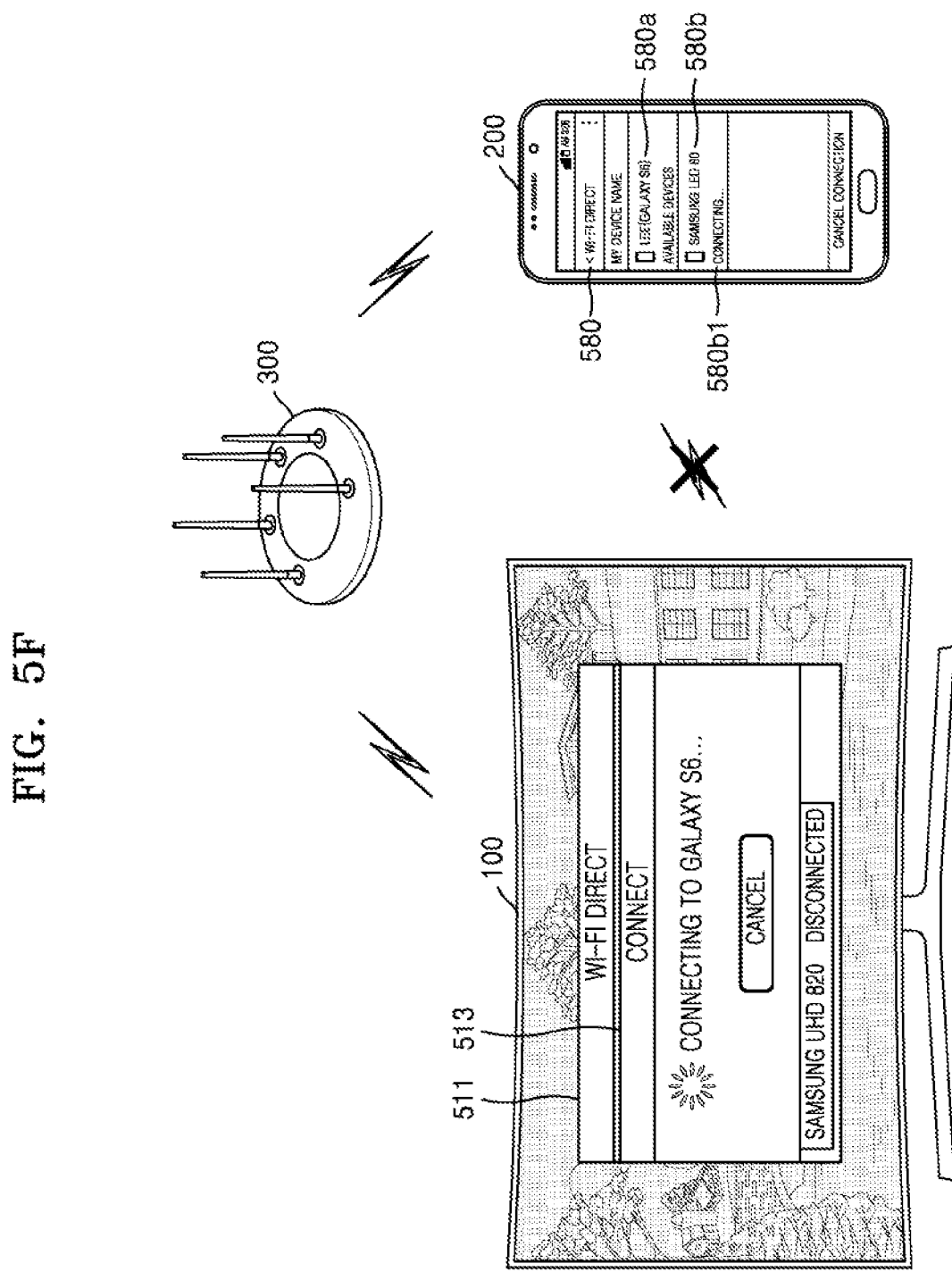

Referring to FIGS. 5E and 5F, the display apparatus 100 may request a wireless connection from the portable apparatus 200 through the communicator 130. The display apparatus 100 may request a connection from the portable apparatus 200 in the Wi-Fi direct scheme due to an input of the user (or the remote controller).

A connection request 512a1 for the ID 512a corresponding to the portable apparatus 200 is received in the Wi-Fi direct screen 510 displayed in the display apparatus 100 due to the input of the user (or the remote controller). The controller 110 of the display apparatus 100 may proceed with connecting to the portable apparatus 200 in the Wi-Fi direct scheme according to an input of the user (or the remote controller). A pop-up 513 corresponding to progress of the connection with the portable apparatus 200 may be displayed in the Wi-Fi direct screen 510.

An ID 580a corresponding to the portable apparatus 200, an ID 580b corresponding to the display apparatus 100 connected to in the Wi-Fi direct scheme, and connection progress 580b1 may be displayed in a Wi-Fi direct screen 580 displayed in the portable apparatus 200.

The display apparatus 100 and the portable apparatus 200 may request the connection through a provision discovery request message, a GO negotiation request message, an invitation request message, or the like. At least one of the aforementioned provision discovery request message, GO negotiation request message, and invitation request message may include AP connection information (e.g., the first AP connection information and the second AP connection information).

The display apparatus 100 may parse the received second AP connection information and store whether the portable apparatus 200 is connected to an AP, an AP frequency band (e.g., 2.4 GHz or 5 GHz), an operating channel number between the portable apparatus and the AP, or the like.

The stored second AP connection information may be used to set an operating channel in a Wi-Fi direct connection process between the display apparatus 100 and the portable apparatus 200.

GO negotiation request messages and GO negotiation response messages exchanged between the display apparatus 100 and the portable apparatus 200 may include not only AP connection information but also GO intent values and operating channel numbers.

For example, the GO negotiation request message of the display apparatus 100 transmitted from the display apparatus 100 to the portable apparatus 200 may include an intent value (e.g., GO intent=15) and an operating channel number (e.g., OP CH=36). The GO negotiation request message transmitted to the portable apparatus 200 may include an AP operating channel frequency band.

Also, the GO negotiation response message of the portable apparatus 200 received from the portable apparatus 200 by the display apparatus 100 may include an intent value (e.g., GO intent=14) and an operating channel number (e.g., OP CH=1). The GO negotiation response message of the portable apparatus 200 may include an AP operating channel frequency band.

An apparatus (e.g., the display apparatus 100) having a larger GO intent value may be determined as a GO. For example, the controller 110 of the display apparatus 100 may determine the GO using a stored intent value of the display apparatus 100, a stored operating channel number of the display apparatus 100, the stored intent value of the portable apparatus 200, or a stored operating channel number of the portable apparatus 200. Also, the controller 110 of the display apparatus 100 may determine the GO using the stored first AP connection information, the stored second AP connection information, the stored intent value of the display apparatus 100, the stored operating channel number of the display apparatus 100, the stored intent value of the portable apparatus 200, or the stored operating channel number of the portable apparatus 200.

The controller 210 of the portable apparatus 200 may determine the GO using the stored intent value of the portable apparatus 200, the stored operating channel number of the portable apparatus 200, the stored intent value of the display apparatus 100, or the stored operating channel number of the display apparatus 100. Also, the controller 210 of the portable apparatus 200 may determine the GO using the stored second AP connection information, the stored first AP connection information, the stored intent value of the portable apparatus 200, the stored operating channel number of the portable apparatus 200, the stored intent value of the display apparatus 100, or the stored operating channel number of the display apparatus 100.

Invitation request messages exchanged between the display apparatus 100 and the portable apparatus 200 may include operating channel numbers as well as AP connection information. For example, the invitation request message of the display apparatus 100 received by the portable apparatus 200 may include an operating channel number (e.g., OP CH=36). Also, the GO negotiation request message of the portable apparatus 200 may include the AP operating channel frequency band. Further, an invitation response message of the portable apparatus 200 received by the display apparatus 100 may include an operating channel number (e.g., OP CH=1). An invitation request message of the portable apparatus 200 may include the AP operating channel frequency band.

Figure 4:
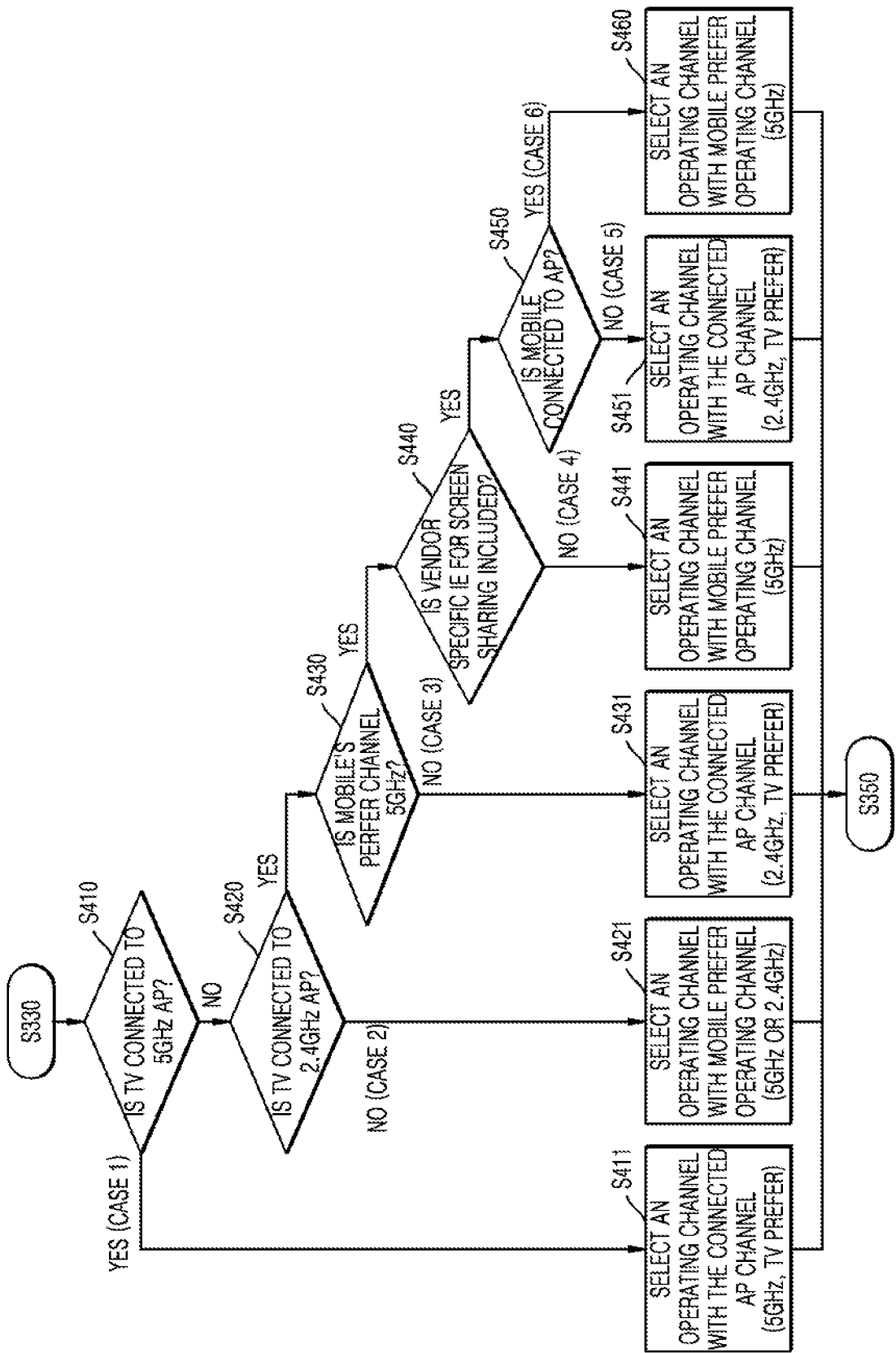
FIG. 4 is a detailed flowchart illustrating a method of setting an operating channel of a display apparatus according to an exemplary embodiment of the present disclosure.

FIG. 4 is a detailed flowchart illustrating a method of setting an operating channel of a display apparatus according to an exemplary embodiment of the present disclosure.

Figure 6:
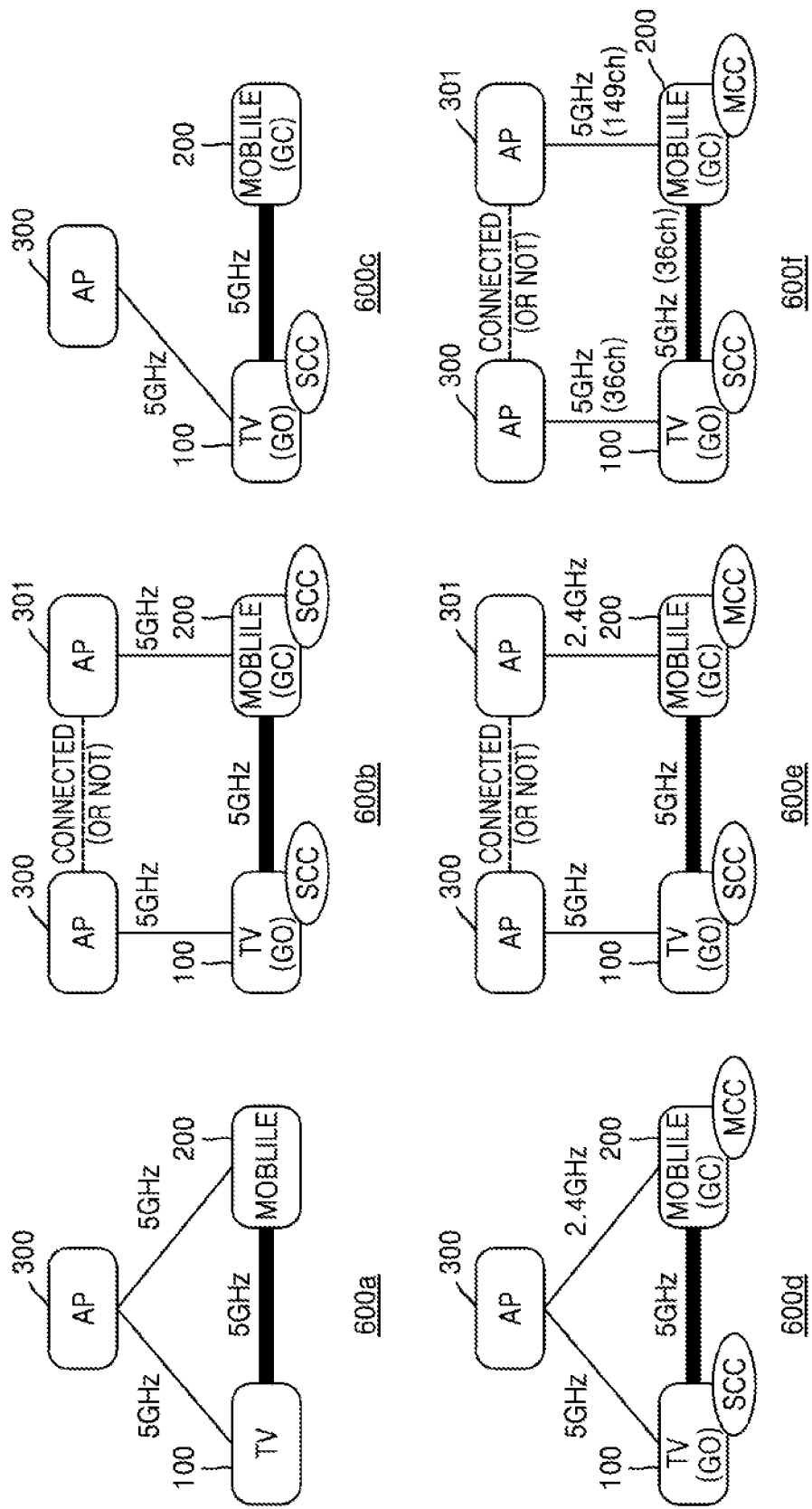
FIG. 6 is a diagram illustrating a method of setting an operating channel between a portable apparatus and a display apparatus according to an exemplary embodiment of the present disclosure.

FIG. 6 is a diagram illustrating a method of setting an operating channel between a portable apparatus and a display apparatus according to an exemplary embodiment of the present disclosure.

In operation S340 of FIG. 3, an operating channel is determined.

Determination of the operating channel between the display apparatus 100 and the portable apparatus 200 will be described in detail with reference to FIGS. 4 and 6.

In operation S410 of FIG. 4, it is determined whether the display apparatus 100, which is the GO, is connected to the AP 300 in the frequency band of 5 GHz.

The controller 110 of the display apparatus 100, which is the GO, may determine whether the display apparatus 100 is connected to the AP 300 in the frequency band of 5 GHz using the first AP connection information.

When the display apparatus 100, which is the GO, is connected to the AP 300 in the frequency band of 5 GHz, the process proceeds to operation S411 of FIG. 4. Also, when the display apparatus 100, which is the GO, is not connected to the AP 300 in the frequency band of 5 GHz, the process proceeds to operation S420 of FIG. 4.

In operation S411 of FIG. 4, the operating channel is determined.

The controller 110 of the display apparatus 100, which is the GO, may determine the operating channel (e.g., OP CH=36) using the first AP connection information, the second AP connection information, an operating channel number of the display apparatus 100, or an operating channel number of the portable apparatus 200.

Referring to 600a to 600f of FIG. 6, when the display apparatus 100, which is the GO, is connected to the AP 300 in the frequency band of 5 GHz, the controller 110 of the display apparatus 100 may determine the operating channel (e.g., OP CH=36) using the first AP connection information, the second AP connection information, the operating channel number of the display apparatus 100, or the operating channel number of the portable apparatus 200.

In 600a of FIG. 6, the display apparatus 100 and the portable apparatus 200 are connected to a single AP 300 having the frequency band of 5 GHz. SCC occurs between the display apparatus 100 and the portable apparatus 200.

In 600b of FIG. 6, the display apparatus 100 is connected to the AP 300 having the frequency band of 5 GHz, and the portable apparatus 200 is connected to the other AP 301 having the frequency band of 5 GHz. SCC occurs between the display apparatus 100 and the portable apparatus 200 similarly to 600a of FIG. 6.

In 600c of FIG. 6, the display apparatus 100 is connected to the AP 300 having the frequency band of 5 GHz. The portable apparatus 200 is not connected to an AP. SCC occurs between the display apparatus 100 and the portable apparatus 200 similarly to 600a of FIG. 6.

In 600d of FIG. 6, the display apparatus 100 is connected to the AP 300 having the frequency band of 5 GHz, and the portable apparatus 200 is connected to the AP 300 having the frequency band of 2.4 GHz. SCC occurs between the display apparatus 100 and the portable apparatus 200. Also, MCC may occur between the portable apparatus 200 and the AP 300. Even when MCC occurs at the portable apparatus 200, which is the group client, the operating channel may be determined by prioritizing the frequency band of 5 GHz to which the display apparatus 100, which is the GO, is connected.

In 600e of FIG. 6, the display apparatus 100 is connected to the AP 300 having the frequency band of 5 GHz, and the portable apparatus 200 is connected to the other AP 301 having the frequency band of 2.4 GHz. SCC occurs between the display apparatus 100 and the portable apparatus 200 similarly to 600d of FIG. 6. Also, MCC may occur between the portable apparatus 200 and the other AP 301. Even when MCC occurs at the portable apparatus 200, which is the group client, the operating channel may be determined by prioritizing the frequency band of 5 GHz to which the display apparatus 100, which is the GO, is connected.

In 600f of FIG. 6, the display apparatus 100 is connected to the AP 300 having the frequency band of 5 GHz (an operating channel number 36), and the portable apparatus 200 is connected to the other AP 301 having the frequency band of 5 GHz (an operating channel number 149). SCC occurs between the display apparatus 100 and the portable apparatus 200 in the frequency band of 5 GHz (the operating channel number 36). Also, MCC may occur between the portable apparatus 200 and the other AP 301 in the frequency band of 5 GHz (an operating channel number between 36 and 149). Even when MCC occurs at the portable apparatus 200, which is the group client, the operating channel may be determined by prioritizing the frequency band of 5 GHz (the operating channel number 36) to which the display apparatus 100, which is the GO, is connected.

The examples (e.g., 600*a* to 600*f*) of FIG. 6 described above are merely exemplary, and those of ordinary skill in the art will easily understand that the present disclosure is not limited thereto (e.g., the present disclosure is applicable to a case in which the display apparatus 100, which is the GO, is connected to the AP 300 in the frequency band of 5 GHz).

When the operating channel is determined in operation S411 of FIG. 4, the process returns to the operation of FIG. 3.

In operation S350 of FIG. 3, the display apparatus 100 and the portable apparatus 200 are connected through the determined operating channel in the Wi-Fi direct scheme.

Figure 5G:
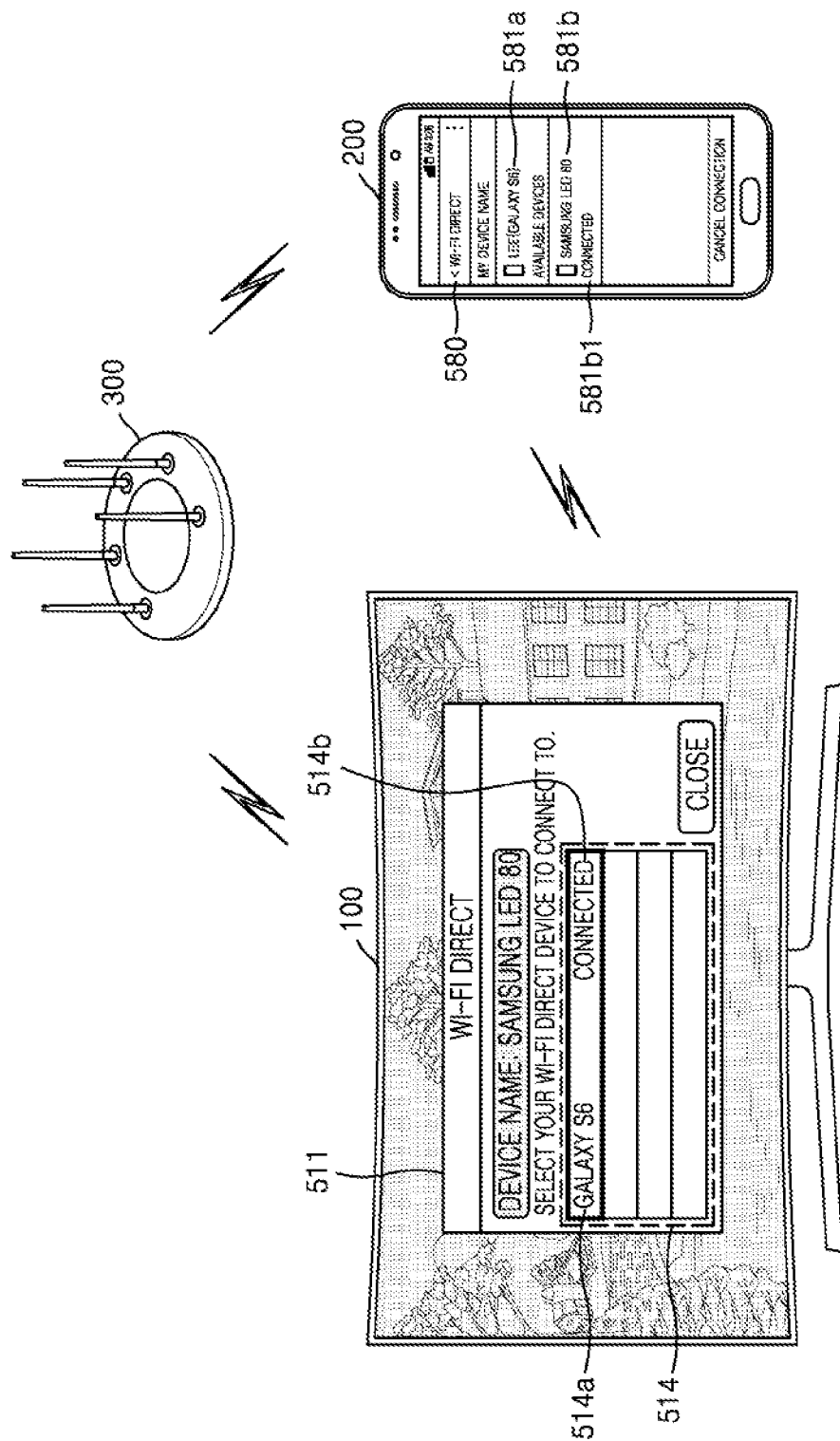

Referring to FIG. 5G, a list 514 including IDs corresponding to one or more devices connected in the Wi-Fi direct scheme may be displayed. An ID 514*a* and a connection state 514*b* corresponding to a connected portable apparatus may be displayed in the list 514.

An ID 581*a* corresponding to the portable apparatus 200, an ID 581*b* corresponding to the display apparatus 100 connected in the Wi-Fi direct scheme, and a connection state 581*b*1 may be displayed in the Wi-Fi direct screen 580 displayed in the portable apparatus 200.

In operation S350 of FIG. 3, when the display apparatus 100 and the portable apparatus 200 are connected through the determined operating channel in the Wi-Fi direct scheme, the method of setting an operating channel of a display apparatus is finished.

Figure 7:
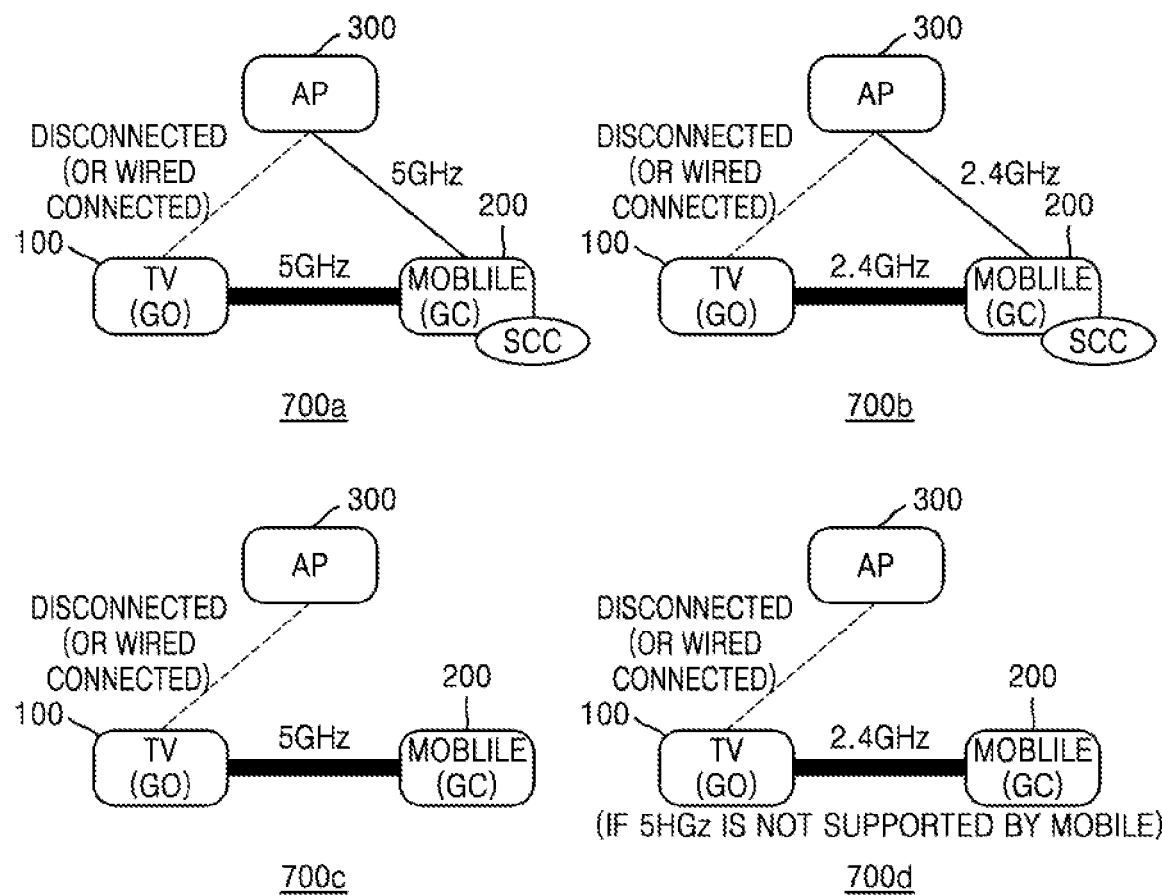
FIG. 7 is a diagram illustrating a method of setting an operating channel between a portable apparatus and a display apparatus according to an exemplary embodiment of the present disclosure.

FIG. 7 is a diagram illustrating a method of setting an operating channel between a portable apparatus and a display apparatus according to an exemplary embodiment of the present disclosure.

Referring back to operation S410 of FIG. 4, when the display apparatus 100, which is the GO, is not connected to the AP 300 in the frequency band of 5 GHz, the process proceeds to operation S420 of FIG. 4.

In operation S420 of FIG. 4, it is determined whether the display apparatus 100, which is the GO, is connected to the AP 300 in the frequency band of 2.4 GHz.

The controller 110 of the display apparatus 100, which is the GO, may determine whether the display apparatus 100 is connected to the AP 300 in the frequency band of 2.4 GHz using the first AP connection information.

When the display apparatus 100, which is the GO, is not connected to the AP 300 in the frequency band of 2.4 GHz, the process proceeds to operation S421 of FIG. 4. Also, when the display apparatus 100, which is the GO, is connected to the AP 300 in the frequency band of 2.4 GHz, the process proceeds to operation S430 of FIG. 4.

In operation S421 of FIG. 4, the operating channel is determined.

The controller 110 of the display apparatus 100, which is the GO, may determine the operating channel (e.g., OP CH=149) using the first AP connection information (or blank AP connection information), the second AP connection information, an operating channel number of the display apparatus 100, or an operating channel number of the portable apparatus 200.

A GO negotiation request message transmitted from the display apparatus 100 to the portable apparatus 200 may include an intent value (e.g., GO intent=15) and an operating channel number (e.g., OP CH=36). A GO negotiation request message transmitted to the portable apparatus 200 may include an AP operating channel frequency band.

Also, a GO negotiation response message received from the portable apparatus 200 by the display apparatus 100 may include an intent value (e.g., GO intent=14) and an operating channel number (e.g., OP CH=149). A GO negotiation response message may include an AP operating channel frequency band.

Likewise, the AP connection information and the operating channel numbers may be included in invitation request messages exchanged between the display apparatus 100 and the portable apparatus 200.

Referring to 700*a* to 700*d* of FIG. 7, the display apparatus 100, which is a GO that is not connected to an AP, may determine the operating channel (e.g., OP CH=149) using the second AP connection information and the operating channel number of the portable apparatus 200.

In 700*a* of FIG. 7, the portable apparatus 200 is connected to the single AP 300 having the frequency band of 5 GHz. The display apparatus 100 and the portable apparatus 200 may be connected through an operating channel in the frequency band of 5 GHz. SCC occurs between the portable apparatus 200 and the AP 300.

In 700*b* of FIG. 7, the portable apparatus 200 is connected to the single AP 300 having the frequency band of 2.4 GHz. The display apparatus 100 and the portable apparatus 200 may be connected through an operating channel in the frequency band of 2.4 GHz. SCC occurs between the portable apparatus 200 and the AP 300 similarly to 700*a* of FIG. 7.

In 700*c* of FIG. 7, neither of the display apparatus 100 and the portable apparatus 200 is connected to the AP 300. The display apparatus 100 and the portable apparatus 200 may be connected through the operating channel in the frequency band of 5 GHz.

In 700*d* of FIG. 7, neither of the display apparatus 100 and the portable apparatus 200 is connected to the AP 300 similarly to 700*c* of FIG. 7. The portable apparatus 200 does not support the frequency band of 5 GHz. The display apparatus 100 and the portable apparatus 200 may be connected through the operating channel in the frequency band of 2.4 GHz.

The examples (e.g., 700*a* to 700*d*) of FIG. 7 described above are merely exemplary, and those of ordinary skill in the art will easily understand that the present disclosure is not limited thereto (e.g., the present disclosure is applicable to a case in which the display apparatus 100, which is the GO, is not connected to an AP).

When the operating channel is determined in operation S421 of FIG. 4, the process returns to the operation of FIG. 3.

In operation S350 of FIG. 3, the display apparatus 100 and the portable apparatus 200 are connected through the determined operating channel in the Wi-Fi direct scheme.

When the display apparatus 100 and the portable apparatus 200 are connected through the determined operating channel in the Wi-Fi direct scheme, the displayed Wi-Fi direct screen 510 of the display apparatus 100 and the displayed Wi-Fi direct screen 580 of the portable apparatus 200 are similar to those of FIG. 5G, and redundant descriptions will be omitted.

In operation S350 of FIG. 3, when the display apparatus 100 and the portable apparatus 200 are connected through the determined operating channel in the Wi-Fi direct scheme, the method of setting an operating channel of a display apparatus is finished.

FIG. 8 is a diagram illustrating a method of setting an operating channel between a portable apparatus and a display apparatus according to an exemplary embodiment of the present disclosure.

Referring back to operation S420 of FIG. 4, when the display apparatus 100, which is the GO, is connected to the AP 300 in the frequency band of 2.4 GHz, the process proceeds to operation S430.

In operation S430 of FIG. 4, the controller 110 of the display apparatus 100, which is the GO connected to the AP 300 in the frequency band of 2.4 GHz, determines whether the portable apparatus 200, which is the group client, is connected to the AP 300 or 301 in the frequency band of 2.4 GHz.

The controller 110 of the display apparatus 100, which is the GO connected to the AP 300 in the frequency band of 2.4 GHz, may determine whether the portable apparatus 200 is connected to the AP 300 in the frequency band of 2.4 GHz using the stored second AP connection information. Also, the controller 110 of the display apparatus 100, which is the GO connected to the AP 300 in the frequency band of 2.4 GHz, may determine whether the portable apparatus 200 is disconnected from the AP 300 using the stored second AP connection information.

When the portable apparatus 200 is connected to the AP 300 in the frequency band of 2.4 GHz or is not connected to an AP, the controller 110 of the display apparatus 100, which is the GO connected to the AP 300 in the frequency band of 2.4 GHz, proceeds to operation S431 of FIG. 4. Also, when the portable apparatus 200 is connected to the AP 300 in the frequency band of 5 GHz, the controller 110 of the display apparatus 100, which is the GO connected to the AP 300 in the frequency band of 2.4 GHz, proceeds to operation S440 of FIG. 4.

In operation S431 of FIG. 4, the operating channel is determined.

The controller 110 of the display apparatus 100, which is the GO connected to the AP 300 in the frequency band of 2.4 GHz, may determine the operating channel (e.g., OP CH=1) using the first AP connection information, the second AP connection information, an operating channel number of the display apparatus 100, or an operating channel number of the portable apparatus 200.

A GO negotiation request message transmitted from the display apparatus 100 to the portable apparatus 200 may include an intent value (e.g., GO intent=15) and an operating channel number (e.g., OP CH=36). A GO negotiation request message transmitted to the portable apparatus 200 may include an AP operating channel frequency band.

Also, a GO negotiation response message received from the portable apparatus 200 by the display apparatus 100 may include an intent value (e.g., GO intent=14) and an operating channel number (e.g., OP CH=1). A GO negotiation response message may include an AP operating channel frequency band.

Likewise, AP connection information and the operating channel numbers may be included in invitation request messages exchanged between the display apparatus 100 and the portable apparatus 200.

Referring to 800a to 800d of FIG. 8, the display apparatus 100, which is the GO connected to the AP 300 in the frequency band of 2.4 GHz, may determine the operating channel (e.g., OP CH=1) using the first AP connection information, the second AP connection information, the operating channel number of the display apparatus 100, or the operating channel number of the portable apparatus 200.

In 800a of FIG. 8, the display apparatus 100 and the portable apparatus 200 are connected to the single AP 300 having the frequency band of 2.4 GHz. The display apparatus 100 and the portable apparatus 200 may be connected through an operating channel in the frequency band of 2.4 GHz. SCC occurs between the display apparatus 100 and the AP 300. Also, SCC occurs between the portable apparatus 200 and the AP 300.

In 800b of FIG. 8, the display apparatus 100 is connected to the AP 300 having the frequency band of 2.4 GHz, and the portable apparatus 200 is connected to the other AP 301 having the frequency band of 2.4 GHz. The display apparatus 100 and the portable apparatus 200 may be connected through the operating channel in the frequency band of 2.4 GHz. SCC occurs between the display apparatus 100 and the AP 300 similarly to 800a of FIG. 8. Also, SCC occurs between the portable apparatus 200 and the AP 300.

In 800c of FIG. 8, the display apparatus 100 is connected to the AP 300 having the frequency band of 2.4 GHz, and the portable apparatus 200 is not connected to the AP 300. The portable apparatus 200 does not support the frequency band of 5 GHz. The display apparatus 100 and the portable apparatus 200 may be connected through the operating channel in the frequency band of 2.4 GHz. SCC occurs between the display apparatus 100 and the AP 300.

In 800d of FIG. 8, neither the display apparatus 100 nor the portable apparatus is connected to the AP 300 similarly to 700c of FIG. 7. The portable apparatus 200 does not support the frequency band of 5 GHz. The display apparatus 100 and the portable apparatus 200 may be connected through the operating channel in the frequency band of 2.4 GHz.

The examples (e.g., 800a to 800d) of FIG. 8 described above are merely exemplary, and those of ordinary skill in the art will easily understand that the present disclosure is not limited thereto (e.g., the present disclosure is applicable to a case in which the controller 110 of the display apparatus 100, which is the GO connected to the AP 300 in the frequency band of 2.4 GHz, determines whether the portable apparatus 200, which is the group client, is connected to the AP 300 or 301 in the frequency band of 2.4 GHz or a case in which the controller 110 of the display apparatus 100, which is the GO connected to the AP 300 in the frequency band of 2.4 GHz, determines that the portable apparatus 200 is not connected to the AP 300 using the stored second AP connection information).

When the operating channel is determined in operation S431 of FIG. 4, the process returns to the operation of FIG. 3.

In operation S350 of FIG. 3, the display apparatus 100 and the portable apparatus 200 are connected through the determined operating channel in the Wi-Fi direct scheme.

When the display apparatus 100 and the portable apparatus 200 are connected through the determined operating channel in the Wi-Fi direct scheme, the displayed Wi-Fi direct screen 510 of the display apparatus 100 and the displayed Wi-Fi direct screen 580 of the portable apparatus 200 are similar to those of FIG. 5G, and redundant descriptions will be omitted.

In operation S350 of FIG. 3, when the display apparatus 100 and the portable apparatus 200 are connected through the determined operating channel in the Wi-Fi direct scheme, the method of setting an operating channel of a display apparatus is finished.

Figure 9:
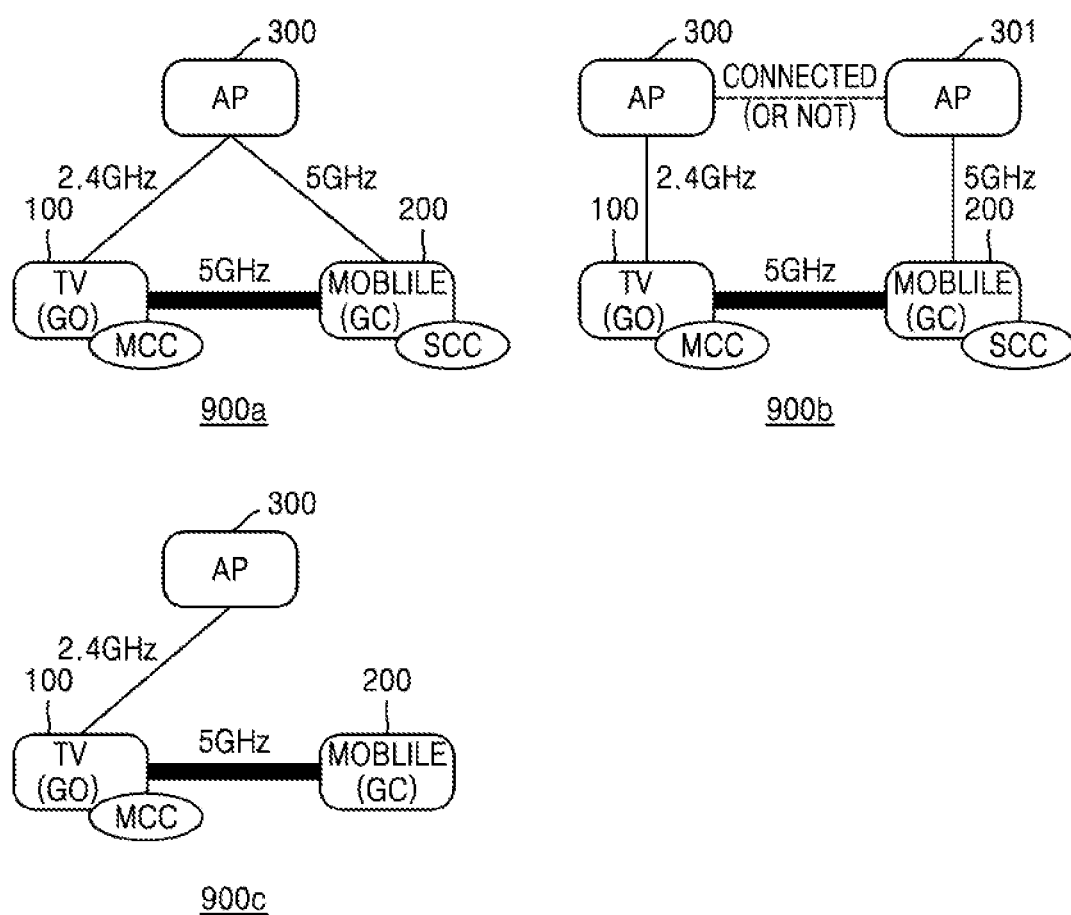
FIG. 9 is a diagram illustrating a method of setting an operating channel between a portable apparatus and a display apparatus according to an exemplary embodiment of the present disclosure.

FIG. 9 is a diagram illustrating a method of setting an operating channel between a portable apparatus and a display apparatus according to an exemplary embodiment of the present disclosure.

Referring back to operation S430 of FIG. 4, when the display apparatus 100, which is the GO, is connected to the AP 300 in the frequency band of 2.4 GHz and the portable apparatus 200, which is the group client, has a preference for the frequency band of 5 GHz, the process proceeds to operation S440.

In operation S440 of FIG. 4, the controller 110 of the display apparatus 100, which is the GO connected to the AP 300 in the frequency band of 2.4 GHz, determines whether the portable apparatus 200, which is the group client, is connected to the AP 300 or 301 in the frequency band of 5 GHz. Also, the controller 110 of the display apparatus 100, which is the GO connected to the AP 300 in the frequency band of 2.4 GHz, may determine whether the portable apparatus 200 (or a third-part device), which is the group client, supports screen sharing.

The controller 110 of the display apparatus 100, which is the GO connected to the AP 300 in the frequency band of 2.4 GHz, may determine whether the portable apparatus 200 is connected to the AP 300 in the frequency band of 5 GHz using the stored second AP connection information. Also, the controller 110 of the display apparatus 100, which is the GO connected to the AP 300 in the frequency band of 2.4 GHz, may determine whether the portable apparatus 200 (or a third-part device) supports screen sharing using the stored second AP connection information.

When the portable apparatus 200 is connected to the AP 300 in the frequency band of 5 GHz or is not connected to an AP, the controller 110 of the display apparatus 100, which is the GO connected to the AP 300 in the frequency band of 2.4 GHz, proceeds to operation S441 of FIG. 4. Also, when the portable apparatus 200 does not support screen sharing, the controller 110 of the display apparatus 100, which is the GO connected to the AP 300 in the frequency band of 2.4 GHz, proceeds to operation S450 of FIG. 4.

In operation S441 of FIG. 4, the operating channel is determined.

The controller 110 of the display apparatus 100, which is the GO connected to the AP 300 in the frequency band of 2.4 GHz, may determine the operating channel (e.g., OP CH=149) using the first AP connection information, an operating channel number of the display apparatus 100, or an operating channel number of the portable apparatus 200.

A GO negotiation request message transmitted from the display apparatus 100 to the portable apparatus 200 may include an intent value (e.g., GO intent=15) and an operating channel number (e.g., OP CH=36). A GO negotiation request message transmitted to the portable apparatus 200 may include an AP operating channel frequency band.

Also, a GO negotiation response message received from the portable apparatus 200 by the display apparatus 100 may include an intent value (e.g., GO intent=14) and an operating channel number (e.g., OP CH=149). Also a GO negotiation response message may include an AP operating channel frequency band.

Likewise, AP connection information and the operating channel numbers may be included in invitation request messages exchanged between the display apparatus 100 and the portable apparatus 200.

Referring to 900a to 900c of FIG. 9, the display apparatus 100, which is the GO connected to the AP 300 in the frequency band of 2.4 GHz, may determine the operating channel (e.g., OP CH=149) using the first AP connection information, the second AP connection information, the operating channel number of the display apparatus 100, or the operating channel number of the portable apparatus 200.

In 900a of FIG. 9, the display apparatus 100 is connected to the AP 300 in the frequency band of 2.4 GHz, and the portable apparatus 200 is connected to the AP 300 in the frequency band of 5 GHz. The display apparatus 100 and the portable apparatus 200 may be connected through an operating channel in the frequency band of 5 GHz. MCC occurs between the display apparatus 100 and the AP 300. Also, SCC occurs between the portable apparatus 200 and the AP 300.

In 900b of FIG. 9, the display apparatus 100 is connected to the AP 300 having the frequency band of 2.4 GHz, and the portable apparatus 200 is connected to the other AP 301 having the frequency band of 5 GHz. The display apparatus 100 and the portable apparatus 200 may be connected through the operating channel in the frequency band of 5 GHz. MCC occurs between the display apparatus 100 and the AP 300 similarly to 900a of FIG. 9. Also, SCC occurs between the portable apparatus 200 and the AP 300.

In 900c of FIG. 9, the display apparatus 100 is connected to the AP 300 having the frequency band of 2.4 GHz, and the portable apparatus 200 is not connected to the AP 300 or 301. The display apparatus 100 and the portable apparatus 200 may be connected through the operating channel in the frequency band of 5 GHz. MCC occurs between the display apparatus 100 and the AP 300.

The examples (e.g., 900a to 900c) of FIG. 9 described above are merely exemplary, and those of ordinary skill in the art will easily understand that the present disclosure is not limited thereto (e.g., the present disclosure is applicable to a case in which the controller 110 of the display apparatus 100, which is the GO connected to the AP 300 in the frequency band of 2.4 GHz, determines whether the portable apparatus 200, which is the group client, is connected to the AP 300 or 301 in the frequency band of 5 GHz or a case in which the controller 110 of the display apparatus 100, which is the GO connected to the AP 300 in the frequency band of 2.4 GHz, determines that the portable apparatus 200 (or the third-par device), which is the group client, does not support screen sharing).

When the operating channel is determined in operation S441 of FIG. 4, the process returns to the operation of FIG. 3.

In operation S350 of FIG. 3, the display apparatus 100 and the portable apparatus 200 are connected through the determined operating channel in the Wi-Fi direct scheme.

When the display apparatus 100 and the portable apparatus 200 are connected through the determined operating channel in the Wi-Fi direct scheme, the displayed Wi-Fi direct screen 510 of the display apparatus 100 and the displayed Wi-Fi direct screen 580 of the portable apparatus 200 are similar to those of FIG. 5G, and redundant descriptions will be omitted.

In operation S350 of FIG. 3, when the display apparatus 100 and the portable apparatus 200 are connected through the determined operating channel in the Wi-Fi direct scheme, the method of setting an operating channel of a display apparatus is finished.

Figure 10:
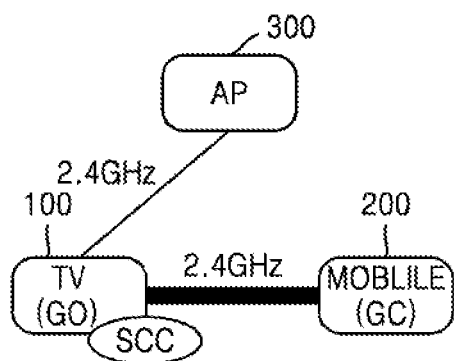
FIG. 10 is a diagram illustrating a method of setting an operating channel between a portable apparatus and a display apparatus according to an exemplary embodiment of the present disclosure.

FIG. 10 is a diagram illustrating a method of setting an operating channel between a portable apparatus and a display apparatus according to an exemplary embodiment of the present disclosure.

Referring back to operation S440 of FIG. 4, when the display apparatus 100, which is the GO, is connected to the AP 300 in the frequency band of 2.4 GHz and the portable apparatus 20,0 which is the group client, is not connected to the AP 300, the process proceeds to operation S450.

In operation S450 of FIG. 4, the controller 110 of the display apparatus 100, which is the GO connected to the AP 300 in the frequency band of 2.4 GHz, determines whether the portable apparatus 200, which is the group client, is connected to the AP 300 or 301. Also, the controller 110 of the display apparatus 100, which is the GO connected to the AP 300 in the frequency band of 2.4 GHz, may determine whether the portable apparatus 200 (or a third-part device), which is the group client, supports screen sharing.

The controller 110 of the display apparatus 100, which is the GO connected to the AP 300 in the frequency band of 2.4 GHz, may determine whether the portable apparatus 200 is connected to the AP 300 using the stored second AP connection information. Also, the controller 110 of the display apparatus 100, which is the GO connected to the AP 300 in the frequency band of 2.4 GHz, may determine whether the portable apparatus 200 (or the third-part device) supports screen sharing using the stored second AP connection information.

When the portable apparatus 200 is not connected to the AP 300, the controller 110 of the display apparatus 100, which is the GO connected to the AP 300 in the frequency band of 2.4 GHz, proceeds to operation S451 of FIG. 4. Also, when the portable apparatus 200 supports screen sharing, the controller 110 of the display apparatus 100, which is the GO connected to the AP 300 in the frequency band of 2.4 GHz, proceeds to operation S460 of FIG. 4.

In operation S451 of FIG. 4, the operating channel is determined.

The controller 110 of the display apparatus 100, which is the GO connected to the AP 300 in the frequency band of 2.4 GHz, may determine the operating channel (e.g., OP CH=1) using the first AP connection information, the second AP connection information (e.g., blank AP connection information), an operating channel number of the display apparatus 100, or an operating channel number of the portable apparatus 200.

A GO negotiation request message transmitted from the display apparatus 100 to the portable apparatus 200 may include an intent value (e.g., GO intent=15) and an operating channel number (e.g., OP CH=1). A GO negotiation request message transmitted to the portable apparatus 200 may include an AP operating channel frequency band.

Also, a GO negotiation response message received from the portable apparatus 200 by the display apparatus 100 may include an intent value (e.g., GO intent=14) and an operating channel number (e.g., OP CH=149). A GO negotiation response message may include an AP operating channel frequency band.

Likewise, the AP connection information and the operating channel numbers may be included in invitation request messages exchanged between the display apparatus 100 and the portable apparatus 200.

Referring to FIG. 10, the display apparatus 100, which is the GO connected to the AP 300 in the frequency band of 2.4 GHz, may determine the operating channel (e.g., OP CH=1) using the first AP connection information, the second AP connection information, the operating channel number of the display apparatus 100, or the operating channel number of the portable apparatus 200.

In FIG. 10, the display apparatus 100 is connected to the AP 300 in the frequency band of 2.4 GHz, and the portable apparatus 200 is not connected to an AP. The display apparatus 100 and the portable apparatus 200 may be connected through an operating channel in the frequency band of 2.4 GHz. SCC occurs between the display apparatus 100 and the AP 300.

The example of FIG. 10 described above is merely exemplary, and those of ordinary skill in the art will easily understand that the present disclosure is not limited thereto (e.g., the present disclosure is applicable to a case in which the controller 110 of the display apparatus 100, which is the GO connected to the AP 300 in the frequency band of 2.4 GHz, determines that the portable apparatus 200, which is the group client, is not connected to the AP 300 or 301).

When the operating channel is determined in operation S451 of FIG. 4, the process returns to the operation of FIG. 3.

In operation S350 of FIG. 3, the display apparatus 100 and the portable apparatus 200 are connected through the determined operating channel in the Wi-Fi direct scheme.

When the display apparatus 100 and the portable apparatus 200 are connected through the determined operating channel in the Wi-Fi direct scheme, the displayed Wi-Fi direct screen 510 of the display apparatus 100 and the displayed Wi-Fi direct screen 580 of the portable apparatus 200 are similar to those of FIG. 5G, and redundant descriptions will be omitted.

In operation S350 of FIG. 3, when the display apparatus 100 and the portable apparatus 200 are connected through the determined operating channel in the Wi-Fi direct scheme, the method of setting an operating channel of a display apparatus is finished.

Figure 11:
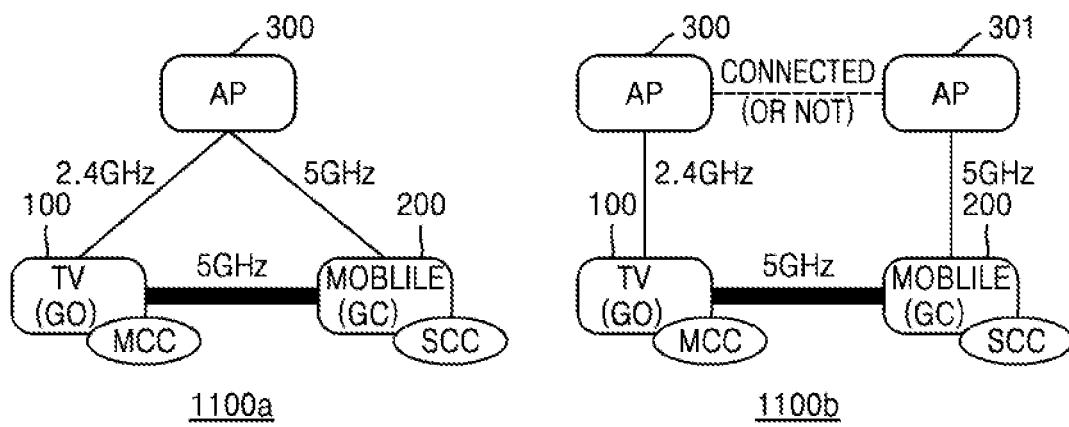
FIG. 11 is a diagram illustrating a method of setting an operating channel between a portable apparatus and a display apparatus according to an exemplary embodiment of the present disclosure.

FIG. 11 is a diagram illustrating a method of setting an operating channel between a portable apparatus and a display apparatus according to an exemplary embodiment of the present disclosure.

Referring back to operation S450 of FIG. 4, the controller 110 of the display apparatus 100, which is the GO connected to the AP 300 in the frequency band of 2.4 GHz, determines whether the portable apparatus 200, which is the group client, is connected to the AP 300 or 301 in the frequency band of 5 GHz. Also, the controller 110 of the display apparatus 100, which is the GO connected to the AP 300 in the frequency band of 2.4 GHz, may determine whether the portable apparatus 200, which is the group client, supports screen sharing.

The controller 110 of the display apparatus 100, which is the GO connected to the AP 300 in the frequency band of 2.4 GHz, may determine whether the portable apparatus 200 is connected to the AP 300 or 301 in the frequency band of 5 GHz using the stored second AP connection information. Also, the controller 110 of the display apparatus 100, which is the GO connected to the AP 300 in the frequency band of 2.4 GHz, may determine whether the portable apparatus 200 supports screen sharing using the stored second AP connection information.

When the display apparatus 100, which is the GO is connected to the AP 300 in the frequency band of 2.4 GHz, and the portable apparatus 200, which is the group client, is connected to the AP 300 or 301 in the frequency band of 5 GHz, the process proceeds to operation S460 of FIG. 4. Also, when the portable apparatus 200 supports screen sharing, the controller 110 of the display apparatus 100, which is the GO connected to the AP 300 in the frequency band of 2.4 GHz, proceeds to operation S460 of FIG. 4.

In operation S460 of FIG. 4, the operating channel is determined.

The controller 110 of the display apparatus 100, which is the GO connected to the AP 300 in the frequency band of 2.4 GHz, may determine the operating channel (e.g., OP CH=149) using the first AP connection information, the second AP connection information, an operating channel number of the display apparatus 100, or an operating channel number of the portable apparatus 200.

A GO negotiation request message transmitted from the display apparatus 100 to the portable apparatus 200 may include an intent value (e.g., GO intent=15) and an operating channel number (e.g., OP CH=1). A GO negotiation request message transmitted to the portable apparatus 200 may include an AP operating channel frequency band.

Also, a GO negotiation response message received from the portable apparatus 200 by the display apparatus 100 may include an intent value (e.g., GO intent=14) and an operating channel number (e.g., OP CH=149). A GO negotiation response message may include an AP operating channel frequency band.

Likewise, the AP connection information and the operating channel numbers may be included in invitation request messages exchanged between the display apparatus 100 and the portable apparatus 200.

Referring to 1100a and 1100b of FIG. 11, the display apparatus 100, which is the GO connected to the AP 300 in the frequency band of 2.4 GHz, may determine the operating channel (e.g., OP CH=149) using the first AP connection information, the second AP connection information, the operating channel number of the display apparatus 100, or the operating channel number of the portable apparatus 200.

In 1100a of FIG. 11, the display apparatus 100 is connected to the AP 300 in the frequency band of 2.4 GHz, and the portable apparatus 200 is connected to the AP 300 in the frequency band of 5 GHz. The display apparatus 100 and the portable apparatus 200 may be connected through an operating channel in the frequency band of 5 GHz. MCC occurs between the display apparatus 100 and the AP 300. Also, SCC occurs between the portable apparatus 200 and the AP 300.

In 1100b of FIG. 11, the display apparatus 100 is connected to the AP 300 having the frequency band of 2.4 GHz, and the portable apparatus 200 is connected to the other AP 301 having the frequency band of 5 GHz. The display apparatus 100 and the portable apparatus 200 may be connected through the operating channel in the frequency band of 5 GHz. MCC occurs between the display apparatus 100 and the AP 300 similarly to 1100a of FIG. 11. Also, SCC occurs between the portable apparatus 200 and the AP 300.

The examples (e.g., 1100a and 1100b) of FIG. 11 described above are merely exemplary, and those of ordinary skill in the art will easily understand that the present disclosure is not limited thereto (e.g., the present disclosure is applicable to a case in which the controller 110 of the display apparatus 100, which is the GO connected to the AP 300 in the frequency band of 2.4 GHz, determines whether or not the portable apparatus 200, which is the group client, is connected to the AP 300 or 301 in the frequency band of 5 GHz or a case in which the controller 110 of the display apparatus 100, which is the GO connected to the AP 300 in the frequency band of 2.4 GHz, determines that the portable apparatus 200, which is the group client, supports screen sharing).

When the operating channel is determined in operation S460 of FIG. 4, the process returns to the operation of FIG. 3.

In operation S350 of FIG. 3, the display apparatus 100 and the portable apparatus 200 are connected through the determined operating channel in the Wi-Fi direct scheme.

When the display apparatus 100 and the portable apparatus 200 are connected through the determined operating channel in the Wi-Fi direct scheme, the displayed Wi-Fi direct screen 510 of the display apparatus 100 and the displayed Wi-Fi direct screen 580 of the portable apparatus 200 are similar to those of FIG. 5G, and redundant descriptions will be omitted.

In operation S350 of FIG. 3, when the display apparatus 100 and the portable apparatus 200 are connected through the determined operating channel in the Wi-Fi direct scheme, the method of setting an operating channel of the display apparatus is finished.

Various embodiments of the present disclosure may provide a display apparatus that may set a P2P operating channel between the display apparatus and a portable apparatus using AP connection information, and a method of setting an operating channel of a display apparatus.

It is possible to provide a display apparatus that may set an optimal P2P operating channel between the display apparatus and a portable apparatus according to whether the display apparatus and an AP are connected and whether the portable apparatus and the AP are connected, and a method of setting an operating channel of the display apparatus.

It is possible to provide a display apparatus that may set an optimal P2P operating channel between the display apparatus and a portable apparatus according to whether the display apparatus and a first AP are connected and whether the portable apparatus and a second AP are connected, and a method of setting an operating channel of the display apparatus.

Effects of the present disclosure are not limited thereto, and various embodiments of the present disclosure may provide a display apparatus that may set a P2P operating channel between the display apparatus and a portable apparatus using AP connection information and a method of setting an operating channel of the display apparatus.

Methods according to exemplary embodiments of the present disclosure may be implemented in the form of program commands which may be executed by various computer means and stored in a computer-readable medium or computer programs in a computer program product. The computer-readable medium may include program commands, data files, data structures, etc. solely or in combination. The computer-readable medium may be stored in a volatile or a non-volatile storage, for example, a storage device, such as a ROM or the like, a memory, for example, a RAM, a memory chip, a memory device, or an IC, or a storage medium, for example, a compact disc (CD), a digital versatile disc (DVD), a magnetic disc, a magnetic tape, or the like, which is optically or magnetically recordable and also readable by a machine (e.g., a computer) regardless of whether the computer-readable medium is detectable or re-recordable.

It is possible to see that a memory which may be included in a portable apparatus is an example of a machine-readable storage medium suitable for storing a program or programs including instructions to implement the embodiments of the present disclosure. Program instructions recorded in the medium may be specially designed and configured for the present disclosure or may be known to and used by those of ordinary skill in the computer software art.

While the present disclosure has been described with reference to limited exemplary embodiments, it will be understood by those or ordinary skill in the art that various modifications and alterations may be made therein.

Therefore, it should be noted that the scope of the present disclosure is not limited to the exemplary embodiments described above and is determined by the claims and equivalents thereof.

What is claimed is:

1. An electronic apparatus comprising:
a communication interface including communication circuitry;
a memory to store first information on a first frequency band which the electronic apparatus uses for wireless communication with an access point (AP); and
a controller configured to:
control the communication interface to receive, from a portable apparatus second information on a second frequency band which the portable apparatus uses for wireless communication with the AP or another AP,
determine a frequency band of a peer-to-peer (P2P) wireless channel between the electronic apparatus and the portable apparatus to one of the first frequency band and the second frequency band, and
control the communication interface to establish a wireless peer-to-peer (P2P) connection with the portable apparatus based on the determined frequency band of P2P wireless channel.

2. The electronic apparatus of claim 1, wherein the controller is further configured to obtain the first information on the first frequency band in response to establishing a wireless connection between the electronic apparatus and the AP.

3. The electronic apparatus of claim 1, wherein the first information on the first frequency band comprises at least one of whether the electronic apparatus and the AP are connected, an operating channel frequency band between the electronic apparatus and the AP, and an operating channel number between the electronic apparatus and the AP.

4. The electronic apparatus of claim 1, wherein the controller is further configured to include the first information on the first frequency band in vendor-specific information elements (IEs) corresponding to a connection between the electronic apparatus and the AP.

5. The electronic apparatus of claim 1, wherein the controller is further configured to include the first information on the first frequency band in vendor-specific capability attributes corresponding to a connection between the electronic apparatus and the AP.

6. The electronic apparatus of claim 2, wherein the controller is further configured to parse the second information on the second frequency band, and
wherein the second information on the second frequency band comprises at least one of whether the portable apparatus and the AP are connected, whether or not the portable apparatus and a second AP are connected, an operating channel frequency band between the portable apparatus and the AP, an operating channel frequency band between the portable apparatus and the second AP, an operating channel number between the portable apparatus and the AP, and an operating channel number between the portable apparatus and the second AP.

7. The electronic apparatus of claim 6, wherein the controller is further configured to parse vendor-specific information elements (IEs) corresponding to the second information on the second frequency band.

8. The electronic apparatus of claim 6, wherein the controller is further configured to parse vendor-specific capability attributes corresponding to the second information on the second frequency band.

9. The electronic apparatus of claim 6, wherein the controller is further configured to differently set the frequency band of the P2P wireless channel according to one of whether the electronic apparatus and the AP are connected, whether the portable apparatus and the AP are connected, and whether the portable apparatus and the another AP are connected.

10. The electronic apparatus of claim 6, wherein the controller is further configured to differently set the frequency band of the P2P wireless channel according to one of a frequency band in which the electronic apparatus and the AP are connected, a frequency band in which the portable apparatus and the AP are connected, and a frequency band in which the portable apparatus and the another AP are connected.

11. The electronic apparatus of claim 1, wherein the controller is further configured to prioritize designation of the P2P wireless channel to a frequency band of 5 GHz over a frequency band of 2.4 GHz.

12. The electronic apparatus of claim 1, wherein the controller is further configured to prioritize designation of the P2P wireless channel to single channel concurrency (SCC) over multi-channel concurrency (MCC).

13. The electronic apparatus of claim 1, wherein the controller is further configured to designate the electronic apparatus as a group owner (GO) using the first information on the first frequency band and the second information on the second frequency band.

14. A method of setting an operating channel of an electronic apparatus, the method comprising:
storing, on a memory of the electronic apparatus, first information on a first frequency band which the electronic apparatus uses for wireless communication with an access point (AP);
receiving, from a portable apparatus, second information on a second frequency band which the portable apparatus uses for wireless communication with the AP or another AP;
determining a frequency band of a peer-to-peer (P2P) wireless channel between the electronic apparatus and the portable apparatus to one of the first frequency band and the second frequency band; and
establishing a wireless peer-to-peer (P2P) connection with the portable apparatus based on the determined frequency band of the P2P wireless channel.

15. The method of claim 14, further comprising:
establishing a wireless connection between the electronic apparatus and the AP, and
obtaining the first information on the first frequency band in response to establishing the wireless connection between the electronic apparatus and the AP.

16. The method of claim 15, wherein the wireless connection between the electronic apparatus and the AP is a Wi-Fi connection.

17. The method of claim 15, further comprising:
determining a group owner (GO) using the first information on the first frequency band and the second information on the second frequency band,
wherein the determining the GO comprises determining the GO based on intent values included in the first information on the first frequency band and the second information on the second frequency band.

18. The method of claim 14, wherein the determining the frequency band of the P2P wireless channel comprises parsing the first information on the first frequency band included in vendor-specific information elements (IEs) corresponding to the wireless communication of the electronic apparatus and the second information on the second frequency band included in vendor-specific IEs corresponding to the wireless communication of the portable apparatus.

19. The method of claim 14, wherein the determining the frequency band of the P2P wireless channel comprises parsing the first information on the first frequency band included in vendor-specific capability attributes corresponding to the wireless communication of the electronic apparatus and the second information on the second frequency band included in vendor-specific capability attributes corresponding to the wireless communication of the portable apparatus.

20. The method of claim 14, wherein the determining the frequency band of the P2P wireless channel comprises designating the frequency band of the P2P wireless channel according to a priority of a frequency band of 5 GHz over a frequency band of 2.4 GHz.

* * * * *